US007089089B2

(12) United States Patent
Cumming et al.

(10) Patent No.: US 7,089,089 B2
(45) Date of Patent: Aug. 8, 2006

(54) METHODS AND APPARATUS FOR RETRIEVING ENERGY READINGS FROM AN ENERGY MONITORING DEVICE

(75) Inventors: Daniel A. Cumming, Sidney (CA); J. Bradford Forth, Victoria (CA); Arthur B. Wynans, Victoria (CA); Eric K. Haight, Victoria (CA); Douglas S. Ransom, Victoria (CA); Martin A. Hancock, Victoria (CA)

(73) Assignee: Power Measurement Ltd., Saanichton (CA)

( * ) Notice: Subject to any disclaimer, the term of this patent is extended or adjusted under 35 U.S.C. 154(b) by 17 days.

(21) Appl. No.: 10/892,837

(22) Filed: Jul. 16, 2004

(65) Prior Publication Data
US 2005/0065743 A1 Mar. 24, 2005

Related U.S. Application Data

(63) Continuation-in-part of application No. PCT/CA04/00705, filed on May 11, 2004, said application No. 10/892,837 is a continuation-in-part of application No. 10/752,467, filed on Jan. 5, 2004.

(60) Provisional application No. 60/554,188, filed on Mar. 18, 2004, provisional application No. 60/488,700, filed on Jul. 18, 2003, provisional application No. 60/469,766, filed on May 12, 2003, provisional application No. 60/459,182, filed on Mar. 31, 2003, provisional application No. 60/459,152, filed on Mar. 31, 2003.

(51) Int. Cl.
*G05D 9/00* (2006.01)
(52) U.S. Cl. .................................................. 700/295

(58) Field of Classification Search ................ 700/286, 700/291, 295–298; 702/44, 45, 57, 60–63; 709/223–227, 230, 238; 713/150, 176, 177
See application file for complete search history.

(56) References Cited

U.S. PATENT DOCUMENTS

| 4,589,075 A | 5/1986 | Buennagel | ................. 364/492 |
| 4,641,284 A | 2/1987 | Suzuki et al. | ................ 364/492 |
| 5,181,026 A | 1/1993 | Granville | |

(Continued)

FOREIGN PATENT DOCUMENTS

EP  395 495 A  10/1990

(Continued)

OTHER PUBLICATIONS

PCT International Search Report PCT/CA2004/000705.

(Continued)

*Primary Examiner*—Maria N. Von Buhr
(74) *Attorney, Agent, or Firm*—Brinks Hofer Gilson & Lione

(57) ABSTRACT

An energy monitoring device including procedures for secure communication of data from the device is disclosed. The energy monitoring device includes a public/private key pair used to encrypt and/or digitally sign communications by the device. This allows the receivers of these communications to authenticate the communications to ensure that the device and/or communications have not been compromised. The energy monitoring device is further capable of communications via an ad-hoc "mesh" network, thereby facilitating communications among devices which are substantially inaccessible due to either physical or economic limitations.

51 Claims, 11 Drawing Sheets

U.S. PATENT DOCUMENTS

| | | | |
|---|---|---|---|
| 5,239,584 A | 8/1993 | Hershey et al. | 380/28 |
| 5,448,229 A | 9/1995 | Lee, Jr. | 340/870.02 |
| 5,459,459 A | 10/1995 | Lee, Jr. | 340/870.02 |
| 5,477,216 A | 12/1995 | Lee, Jr. et al. | 340/870.02 |
| 5,495,239 A | 2/1996 | Ouellette | 340/870.02 |
| 5,517,423 A | 5/1996 | Pomatto | 364/492 |
| 5,563,506 A | 10/1996 | Fielden et al. | |
| 5,572,438 A | 11/1996 | Ehlers et al. | 364/492 |
| 5,576,700 A | 11/1996 | Davis et al. | 340/825.16 |
| 5,644,514 A | 7/1997 | Abo et al. | |
| 5,680,324 A | 10/1997 | Schweitzer, III et al. | 364/514 |
| 5,684,466 A | 11/1997 | Keating et al. | |
| 5,699,276 A | 12/1997 | Roos | 364/514 |
| 5,736,847 A | 4/1998 | Van Doorn et al. | 324/142 |
| 5,764,155 A | 6/1998 | Kertesz et al. | 340/825.08 |
| 5,862,391 A | 1/1999 | Salas et al. | 395/750.01 |
| 5,897,607 A | 4/1999 | Jenney et al. | 702/62 |
| 5,949,230 A | 9/1999 | Kobayashi et al. | 327/72.5 |
| 5,956,220 A | 9/1999 | Novosel et al. | |
| 6,005,759 A | 12/1999 | Hart et al. | 361/66 |
| 6,018,700 A | 1/2000 | Edel | 702/60 |
| 6,028,857 A | 2/2000 | Poor | 370/351 |
| 6,035,285 A | 3/2000 | Schlect et al. | 705/30 |
| 6,088,659 A | 7/2000 | Kelley et al. | 702/62 |
| 6,118,269 A | 9/2000 | Davis | 324/110 |
| 6,154,710 A | 11/2000 | Kobayashi et al. | 702/65 |
| 6,167,389 A | 12/2000 | Davis et al. | 705/412 |
| 6,169,979 B1 | 1/2001 | Johnson | 705/412 |
| 6,178,362 B1 | 1/2001 | Woolard et al. | 700/295 |
| 6,233,327 B1 | 5/2001 | Petite | 379/155 |
| 6,259,972 B1 | 7/2001 | Sumic et al. | 700/286 |
| 6,278,357 B1 | 8/2001 | Croushore et al. | |
| 6,285,917 B1 | 9/2001 | Sekiguchi et al. | |
| 6,313,752 B1 | 11/2001 | Corrigan et al. | 340/657 |
| 6,327,541 B1 | 12/2001 | Pitchford et al. | 702/62 |
| 6,373,238 B1 | 4/2002 | Lewis et al. | 324/107 |
| 6,437,692 B1 | 8/2002 | Petite et al. | 340/540 |
| 6,462,713 B1 | 10/2002 | Porter et al. | 343/719 |
| 6,470,283 B1 | 10/2002 | Edel | 702/64 |
| 6,535,797 B1 | 3/2003 | Bowles et al. | 700/286 |
| 6,549,880 B1 | 4/2003 | Willoughby et al. | 703/13 |
| 6,553,418 B1 | 4/2003 | Collins et al. | 709/224 |
| 6,618,578 B1 | 9/2003 | Petite | 455/92 |
| 6,628,764 B1 | 9/2003 | Petite | 379/106.01 |
| 6,633,823 B1 | 10/2003 | Bartone et al. | 702/57 |
| 6,650,249 B1 | 11/2003 | Meyer et al. | 340/870.028 |
| 6,671,586 B1 | 12/2003 | Davis et al. | 700/295 |
| 6,694,270 B1 | 2/2004 | Hart | |
| 6,735,630 B1* | 5/2004 | Gelvin et al. | 709/224 |
| 2001/0010032 A1 | 7/2001 | Ehlers et al. | 702/62 |
| 2001/0015640 A1 | 8/2001 | Hemminger et al. | 324/142 |
| 2001/0038343 A1 | 11/2001 | Meyer et al. | 340/870.02 |
| 2001/0039537 A1 | 11/2001 | Carpenter et al. | 705/400 |
| 2002/0019712 A1 | 2/2002 | Petite et al. | 702/61 |
| 2002/0019725 A1 | 2/2002 | Petite | 702/188 |
| 2002/0071296 A1 | 6/2002 | Hemminger et al. | 363/34 |
| 2002/0077729 A1 | 6/2002 | Anderson | 700/291 |
| 2002/0091784 A1 | 7/2002 | Baker et al. | 709/208 |
| 2002/0094799 A1* | 7/2002 | Elliott et al. | 455/405 |
| 2002/0109608 A1 | 8/2002 | Petite et al. | 340/870.02 |
| 2002/0116550 A1 | 8/2002 | Hansen | 709/330 |
| 2002/0120685 A1 | 8/2002 | Srivastava et al. | 709/203 |
| 2002/0150110 A1 | 10/2002 | Inbar et al. | 370/401 |
| 2002/0161536 A1 | 10/2002 | Suh et al. | 702/62 |
| 2002/0169643 A1 | 11/2002 | Petite et al. | 705/5 |
| 2003/0043763 A1* | 3/2003 | Grayson | 370/329 |
| 2003/0063723 A1 | 4/2003 | Booth et al. | 379/106.03 |
| 2003/0067425 A1 | 4/2003 | Horvath et al. | |
| 2003/0078029 A1 | 4/2003 | Petite | 455/404 |
| 2003/0098679 A1 | 5/2003 | Odaohhara | |
| 2003/0174067 A1* | 9/2003 | Soliman | 340/870.02 |
| 2003/0176952 A1 | 9/2003 | Collins et al. | 700/286 |
| 2003/0179135 A1 | 9/2003 | Louhi | 342/359 |
| 2004/0001008 A1 | 1/2004 | Shuey et al. | 340/870.02 |
| 2004/0001532 A1 | 1/2004 | Mason, Jr. et al. | 375/136 |
| 2004/0008691 A1* | 1/2004 | Winter et al. | 370/395.31 |
| 2005/0055432 A1* | 3/2005 | Rodgers | 709/223 |
| 2005/0065742 A1* | 3/2005 | Rodgers | 702/62 |
| 2005/0184882 A1* | 8/2005 | Angelis et al. | 340/870.02 |

FOREIGN PATENT DOCUMENTS

| | | |
|---|---|---|
| EP | 957 607 A1 | 11/1999 |
| WO | WO 01/59965 A1 | 8/2001 |

OTHER PUBLICATIONS

PCT International Search Report for Application No. PCT/US04/23006.

Questra Applications Summary Data Sheet, pp. 1-2, Jul. 2, 2002.

Tridium™ Vykon™ Energy "JACE-401™" Product Data Sheet, pp. 1-2, Sep. 16, 2002.

Tridium™ Vykon™ Energy "Vykon Energy Profiler" Product Data Sheet, pp. 1-4, Oct. 16, 2001.

Schneider Electric Square D "Web-Enabled Power Management Solutions" brochure, pp. 1-8, Jan. 2002.

Tridium™ Vykon™ Building "Vykon™ Alarm Service" Product Data Sheet, pp. 1-2, Jun. 20, 2002.

Tridium™ Vykon™ Building "JACE-512™" Product Data Sheet, pp. 1-2, May 15, 2002.

Tridium™ Vykon™ Building "JACE-511™" Product Data Sheet, pp. 1-2, May 28, 2002.

Vykon™ By Tridium "JACE-NP-1®" Product Data Sheet, pp. 1-2, May 28, 2002.

Vykon™ By Tridium "WorkPlace Pro™" Product Data Sheet, pp. 1-2, Jan. 12, 2001.

Vykon™ Building "Web Supervisor™" Product Data Sheet, pp. 1-2, Nov. 30, 2001.

A8800-1 AcquiSuite Data Acquisition System specification, pp. 1-2, Sep. 24, 2001.

LiveData® Real-Time Data Management For Energy and Utility Companies brochure, pp. 1-4, © copyright 2002, Rev. Jan. 2002.

Tridium™ Vykon™ Energy "With the Right Tools Energy Costs are Controllable . . . " brochure, pp. 1-8, Nov. 1, 2001.

EnergyView™ "Energy Aggregation & Information System (EAIS) for Monitoring and Analysis of Electric and Gas Demand", selected pages from an EnergyView website http://66.64.38.69/energyview, pp. 1-4, Oct. 30, 2001.

Power Monitoring home page, obtained from http://www.parijat.com/Power_Monitoring htm, Oct. 9, 2002, one page.

Press Release Aug. 24, 2000 "Connect One Announces Industry's First Wireless Chip to Connect Mobile Devices to the Internet", pp. 1-2.

Press Release, "Connect One and NAMS Create the World's First Dial-up Energy Meter that Sends and Receives E-Mail Without a Gateway", Sep. 5, 2000, pp. 1-2.

NAMS Metals by Nisko, NMM-AKB Specifications p. 1 of 1, Sep. 5, 2000.

Connect One "Automatic Meter Reading via the Internet", pp. 1-2, Jul. 11, 2001.

iModem™ "The Fastest Way to Internet-Enable any Device", pp. 1-3, Jul. 11, 2001.

ConnectOne™ Connecting your Device to the Internet™ iChip™ The Internet in your palm™, pp. 1-6, Jul. 11, 2001.

Engage Networks Launches Energy Management Venture, obtained at internet address http://www.engagenet.com/content/business_journal.shtml , Sep. 20, 2000. Appeared in Business Journal Feb. 11, 2000, 2 pages.

Engage Networks Inc. "D-Gen" Distributed Generation Management brochure, pp. 1-4. Link present as of Dec. 2, 1998 according to web archive at http://web.archive.org/web/19981205200934/www.engagenet.com/products.htm.

Engage Networks Inc. "Internet Protocl Card for Revenue Meters" brochure, pp. 1-2, Link present as of Mar. 3, 2000 on http://web.archive.org/web/20010306005433/www.engagenet.com/content/products.shtml. Original document archived at http://web.archive.org/web/20030520161648/http://www.engagenet.com/datasheets/ipcard.pdf on May 20, 2003.

Engage Networks Inc. "AEM" (Active Energy Management) brochure, pp. 1-2. Link present as of Mar. 3, 2000 on http://web.archive.org/web/20010306005433/www.engagenet.com/content/products. shtml. Original document archived at http://web.archive.org/web/20030520161850/http://www.engagenet.com/datasheets/aem.pdf.

David W. Giles, "Direct-Access Metering Via the Web", 1998 CEA Conference, Toronto, Canada, pp. 1-19, © 1998 Power Measurement Ltd. Conference Apr. 27-29, 1998. Presented Apr. 29, 1998.

GE Industrial Systems "EnerVista.com" brochure, Sep. 2000.

Press release, Santa Clara, CA Sep. 25, 2000 "Connect One Reduces Time, Cost and Complexity to Connect Internet Appliances to Ethernet Lans", obtained at internet address http://www.connectone.com/html/prlsep25_2000.htm.

Year 2000 Rediness Disclosure Arcom Control Systems, "Apex", obtained at internet address http://www.arcomcontrols.com/products/pcp/pcp10.htm. Document archived at http://web.archive.org/web/20000530063150/www.arcomcontrols.com/products/pcp/pcp10.htm on May 30, 2000.

Dranetz BMI, Signature System™ "Information, Knowledge, Power" brochure. Applicants believe this reference was published prior to Jan. 9, 2003.

Signature System™ Basics, obtained at internet address http://www.signaturesystem.com/sigbasics.html, Mar. 26, 2001. pp. 1-2.

Signature System™ InfoNodes, obtained at internet address http://www.signaturesystem.com/infonode.html, Mar. 26, 2001. pp. 1-2.

Questra A2B.Platform™ brochure, "Enabling conversation through universal connectivity", pp. 1-4, located at http://www.questra.com/h1_products/Questra.A2Bplatform.
Applicants believe this reference was published prior to Jan. 9, 2003.

Questra A2B.Sales™ brochure, "Conversation to help you win", pp. 1-2, located at http://www.questra.com/h1_products/Questra_A2Bsales. Applicants believe this reference was published prior to Jan. 9, 2003.

Power Point Presentation: Presented at "Metering Europe 2000," Sep. 5-7, 2000, source http://www.energyict.com/fh/media/Presentation_Metering2000Munchen5.zip, pp. 1-37.

Brochure, RTU+Server, source http://www.energyict.com/fh/media/tru_plus_server.pdf, pp. 1-3, Apr. 6, 2001. Document archived at http://web.archive.org/web/20020702060538/http://www.energyict.com/fh/media/rtu_plus_server.pdf Feb. 7, 2001. Link present on http://web.archive.org/web/20010207201520/www.energyict.com/fa/en_ab_frame.htm on or before Feb. 7, 2001.

Brochure, EiServer, The Energy Information server, source http://www.energyict.com/fh/media/EiServer.pdf, pp. 1-7, Jul. 14, 2000. Link present on or before Feb. 7, 2001.

Advertisement, EiServer and RTU+Server, source, Metering International—2001 Issue 1, p. 19, publish date 1st Quarter 2001, p. 1.

Article, "Providing Tomorrow's Energy Management and Metering Tools Today," source, Metering International—2001 Issue 1, p. 18, publish date 1st Quarter 2001, p. 1.

"Email relating to the general technology of the application received from a competitor", from Erich W. Gunther [mailto:erich@electrotek.com] to Brad_Forth@pml.com sent May 9, 2001 3:36pm, pp. 1-2.

Electro Industries Press Release "Nexus 1250 High-Performance Power Monitor Gains Ethernet TCP/IP Capabilities," obtained at internet address http://www.electroindustries.com/feb5.html, Feb. 5, 2001 pp. 1-2.

Electro Industries "Nexus 1250 for Industry and Utilities," brochure, obtained at internet address http://www.electroindustries.com/pdf/nxsbrochure.pdf pp. 1-14 printed Jun. 1, 2001.

NetSilicon Solutions on Chip "NET+ARM™ Ethernet Processors" brochure, obtained at internet address http://www.netsilicon.com/EmbWeb/products/netarm.asp, pp. 1-2, Copyright© 2001 NetSilicon, Inc. Document archived http:///web.archive.org/web/20010719171514/www.netsilicon.com/embweb/products/netarm.asp on Jul. 19, 2001 on Jul. 19, 2001.

EmWare® "Solutions Device Link," brochure, obtained at internet address http://www.emware.com/solutions/devicelink/, pp. 1-3, printed Jun. 1, 2001. Document archived http://web.archive.org/web/20010524222001/www.emware.com/solutions/devicelink/ May 24, 2001.

IReady® "Technology iReady's Hardwired TCP/IP Stack," homepage, obtained at internet address http://www.iready.com/. p. 1, © 2000-2001 iReady corporation, printed Jun. 1, 2001. First publishes as early as Mar. 1, 2001. http://web.archive.org/web/20010515202409/http://www.iready.com/ link on right side to "technology/index.html" captured Mar. 15, 2001.

muNet News & Events Press Releases "muNet makes cable industry debut with its WebGate™ Internet Residential and Commercial Information Systems, and HomeHeartBeat", http://www.munet.com, pp. 1-2, Dec. 15, 1999.

muNet News & Events Press Release "muNet's WebGate™ Systems Finds a Home on the Internet!" http://www.munet.com, pp. 1-2, Mar. 18, 1999.

webGate™ IRIS Technology, products brochure 9 pages. Applicants believe this reference was published prior to Jan. 9, 2003.

MuNet News & Events Press Release "muNet Demonstrates End-to-End IP-Based Energy Management System at DistribuTECH," Feb. 5, 2000, pp. 1-2.

WebGate™ IRIS™ "Internet Residential Information System," p. 1 of 1 Published in Energy IT Nov./Dec. 2000 Technology Info Center. See http://www.platts.com/infotech/issues/0011/eittic0011.shtml for this reference—search for munet.com.

WebGate™ ICIS™ "Internet Commercial Information System," p. 1 of 1 Published in Energy IT Nov./Dec. 2000 Technology Info Center. See http://www.platts.com/infotech/issues/0011/eittic0011.shtml for this reference—search for munet.com.

F. Momal, C. Pinto-Pereira, "Using World-Wide-Web for Control Systems" Abstract, AT Division CERN, 1211 Geneva 23, 6 pages. Published 1995.

P. M. Corcoran, J. Desbonnet and K. Lusted THPM 14.2 "CEBus Network Access via the World-Wide-Web" Abstract, © 1996 IEEE, pp. 236 & 237.

ATI Systems, "Technical Overview Ethernet SCAN II™ Module" specification, Oct. 1994, 2 pages.

J. Hofman, "The Consumer Electronic Bus: An Integrated Multi-Media LAN for the Home", International Journal of Digital and Analog Communication Systems, vol. 4, 77-86 (1991), © 1991 by John Wiley & Sons, Ltd.

Lucent Technologies AT&T Forms Expert Team to Design Utility Industry Solutions, press release, Monday, Jan. 23, 1995, pp. 1&2.

Newsbytes Inc., Tampa, FLA, Apr. 13, 1995 pNEW04130013 TECO & IBM—The "Smart House" Is Here Press release, obtained at http://filebox.vt.edu/users/mikemike/smart-house/infotrac/article4.txt, Jul. 11, 2002, pp. 1&2.

Distributed.Net, http://n0cgi.distributed.net/faq/cache/178.html, printed Jun. 10, 2003. Link archived at http://web.archive.org/web/20000901052607/n0cgi.distributed.net/fag/cache/178.html on Sep. 1, 2000.

Questra, Security overview, obtained http://www.questra.com/products/security.asp, printed Jun. 10, 2003, pp. 1-3. Applicants believe this reference was published prior to Jan. 9, 2003.

Questra Mastering Smart Security brochure, 2 pages Copyright 2002 Questra Corporation, obtained http://www.questra.com/collateral/collateral_files/SecurityOverview.pdf, printed Jun. 10, 2003. Applicants believe this reference was published prior to Jan. 9, 2003.

Questra Total Access data sheet, 2 pages, Copyright 2003 Questra Corporation, obtained http://www.questra.com/collateral/collateral_files/TotalAccess.pdf, printed Jun. 10, 2003. Applicants believe this reference was published prior to Jan. 9, 2003.

Axeda DRM System Overview, pp. 1-2, obtained http://www.axeda.com/solutions/overview.html, printed Jun. 9, 2003. Applicants believe this reference was published prior to Jan. 9, 2003.

Axeda Access, pp. 1-3, obtained http://www.axeda.com/solutions/portals/portal_access.html, printed Jun. 9, 2003. Applicants believe this reference was published prior to Jan. 9, 2003.

Axeda DRM Technology Overview, 1 page, obtained http://www.axeda.com/solutions/tech_challenges/firewallfriendly.html, printed Jun. 9, 2003. Applicants believe this reference was published prior to Jan. 9, 2003.

Axeda DRM Technology Overview, 1 page, obtained http://www.axeda.com/solutions/tech_challenges/index.html, printed Jun. 9, 2003. Applicants believe this reference was published prior to Jan. 9, 2003.

Axeda DRM Technology Overview, 1 page, obtained http://www.axeda.com/solutions/tech_challenges/standards.html, printed Jun. 9, 2003. Applicants believe this reference was published prior to Jan. 9, 2003.

Axeda Solutions for Industry, 1 page, obtained http://www.axeda.com/solutions/industries/industrial.html, printed Jun. 9, 2003. Archived at http://web.archive.org/web/20020221165907/http://axeda.com/industries/industrial.html on Feb. 21, 2002.

Axeda Agents, pp. 1-2, obtained http://www.axeda.com/solutions/device_servers/index.html, printed Jun. 9, 2003. Applicants believe this reference was published prior to Jan. 9, 2003.

Axeda Case Studies, "Axeda Prevents Power Failures at a Leading Microprocessor Plant in Israel", pp. 1-2, obtained http://www.axeda.com/industies/casestudies_microprocessor.html, printed Jun. 9, 2003. Applicants believe this reference was published prior to Jan. 9, 2003.

David Mueller and Sandy Smith, Electrotek Concepts, "Using Web-based Power Quality Monitoring for Problem Solving and Improving Customer Relations", proceedings of the 4th Annual Latin American Power 99 Conference, Jun. 29, 1999, 9 pages.

Tele-Service News, dated Aug. 2002, Section: No. 8, vol. 14—"Ultra-Wideband Growth Predicted to Explode", 1 page.

Dr. Fontana, Multispectral Solutions, Inc.—History of UWB Technology—"A Brief History of UWB Communications" pp. 1-10, printed Jul. 1, 2004.

Patrick Mannion, CommsDesign EE Times "Ultrawideband facts and fictions", dated Feb. 1, 2002, pp. 1-4, printed Jul. 1, 2004.

Ian Cameron, Electronics Times, "Ultrawideband radio attacks spectrum drought", dated Sep. 26, 2002, pp. 1-5.

Dave Farber, Interesting-People Message "IP: Ultrawideband Squeezes In", dated Aug. 16, 2002, pp. 1-4, printed Jul. 1, 2004.

David G. Leeper, Scientific American.com, Wireless Data Blaster, dated May 4, 2002, pp. 1-4, obtained from http://www.sciam.com/print_version.cfm?articleID=0002D51D-0A78-1CD4-B4A8809EC5, printed Jul. 1, 2004.

Elster, "A3 ALPHA® Meter With Network Collector Capabilities", Specifications, © 2003 by Elster Electricity, LLC, Raleigh, NC, Aug. 2003, 2 pages.

Elster, EnergyAxis® System Architecture, 1 page, no date.

Elster, "EnergyAxis® System Technology to Empower Utilities," brochure, Elster Electricity, LLC, Raleigh, NC, 6 pages, no date.

Elster "REX™ Meter", Specifications, © 2003 by Elster Electricity, LLC, Raleigh, NC, Aug. 2003, 2 pages.

Elster "Elster Electricity Announces New EnergyAxis® System with Intelligent Two-Way Communications" Corporate profile, © 2003 by Elster Electricity, LLC, Raleigh, NC, Aug. 2003, 1 page.

Elster Press Release Sep. 8, 2003, "Elster Electricity Introduces EnergyAxis® System for Residential and Small C&I Metering Automation", Elster Electricity, LLC, Raleigh, NC, 2 pages.

Kreiss Johnson brochure, "Open advancing substation automation", © 2003 Kreiss Johnson Technologies, Inc., San Diego, CA, 13 pages.

Electrex "New Eco Logger" brochure, 3 pages.

Ilsco KUP-L-TAP® brochure, Ilsco, Cincinnato, OH, pp. 201-204, no date.

* cited by examiner

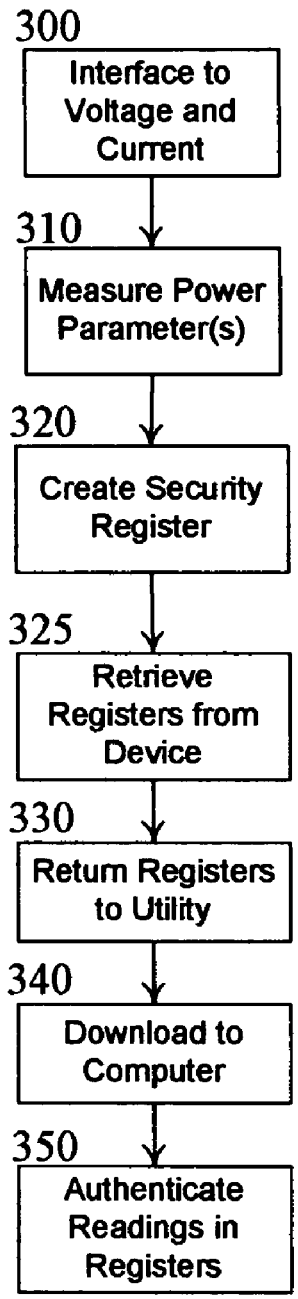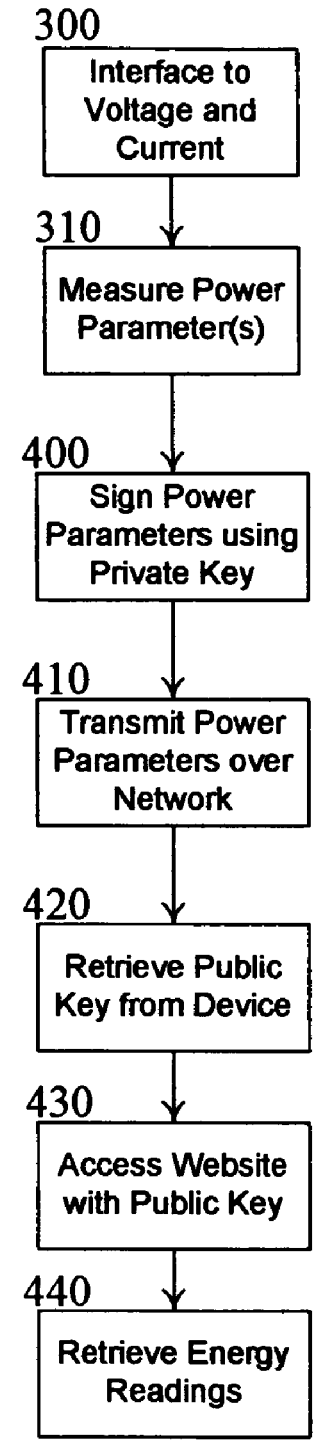
Fig. 3
Fig. 4

Fig. 7
| | V1 | V2 | V3 | I1 | I2 | I3 | VA1 | VA2 | VA3 | W1 | W2 | W3 | VAR1 | VAR2 | VAR3 | THV1 | THV2 | THV3 | THI1 | THI2 | THI3 | |
|---|---|---|---|---|---|---|---|---|---|---|---|---|---|---|---|---|---|---|---|---|---|---|
| Floor3-Panel2 | 409 | 408 | 408 | 99 | 76 | 105 | 40 | 31 | 43 | 20 | 16 | 21 | 32 | 25 | 34 | 0 | 119 | 241 | 10 | 129 | 252 | OK |
| Floor3-Panel5 | 410 | 408 | 407 | 99 | 0 | 105 | 41 | 0 | 43 | 20 | 0 | 21 | 32 | 0 | 34 | 0 | 119 | 239 | 0 | 0 | 249 | WARNING!! I2 shows no current |
| Floor5-Panel1 | 405 | 408 | 408 | 99 | 76 | 105 | 40 | -31 | 43 | 20 | -16 | 21 | 32 | -25 | 34 | 0 | 239 | 121 | 9 | 131 | 251 | ERROR!! Bad phase connection |
| Floor6-Panel1 | 400 | 408 | 408 | 99 | 76 | 105 | 40 | 31 | 43 | 20 | -16 | 21 | 32 | 25 | 34 | 0 | 121 | 242 | 11 | 308 | 251 | WARNING: I2 reversed |
Fig. 8
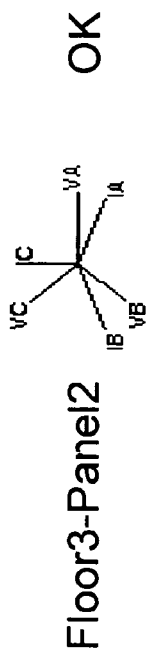
Floor3-Panel2    OK
Floor3-Panel5    WARNING: IB shows no current
Floor3-Panel5    ERROR: VC and VA swapped

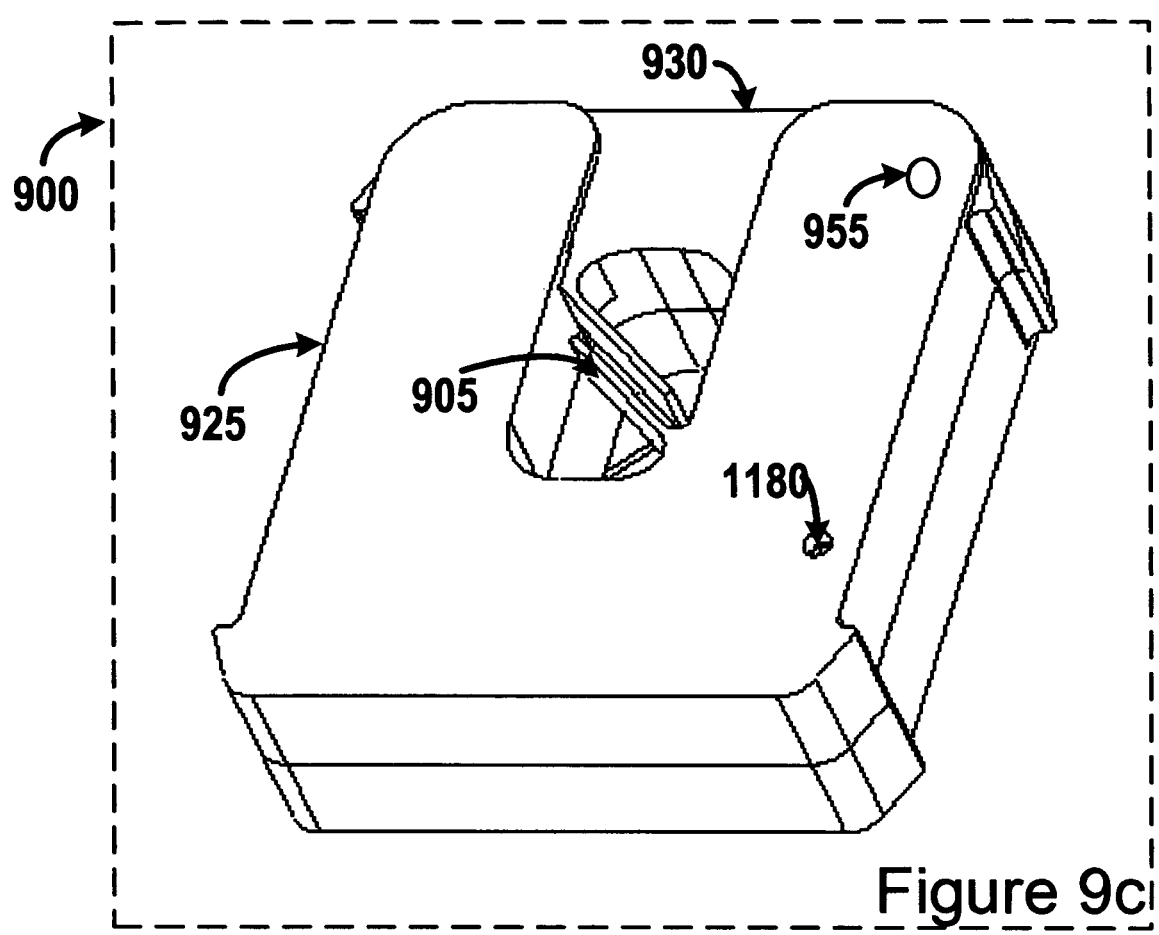

METHODS AND APPARATUS FOR RETRIEVING ENERGY READINGS FROM AN ENERGY MONITORING DEVICE

RELATED APPLICATION

The present patent document claims the benefit of the filing date under 35 U.S.C. 119(e) of Provisional U.S. Patent Applications Ser. No. 60/488,700, filed Jul. 18, 2003 and Ser. No. 60/554,188, filed Mar. 18, 2004 and this application is a continuation in part under 35 U.S.C. §120 and § 365(c) of PCT International Patent Application Designating the U.S. Ser. No. PCT/CA2004/000705 entitled "Time Coordinated Energy Monitoring System Utilizing Communications Links" filed May 11, 2004 which claimed the benefit under 35 U.S.C. §119(e) of Provisional U.S. Patent Application Ser. No. 60/469,766, filed May 12, 2003, all of which are hereby incorporated by reference.

The present patent document is also a continuation in part under 35 U.S.C. §120 of U.S. patent application Ser. No. 10/752,467 filed Jan. 5, 2004 which claimed the benefit under 35 U.S.C. §119(e) of Provisional U.S. Patent Application Ser. Nos. 60/459,182 entitled "Access Control for Energy Management Components", filed Mar. 31, 2003 and 60/459,152 entitled "Techniques for Securing Energy Management Systems" filed Mar. 31, 2003, all of which are hereby incorporated by reference.

PCT International Patent Application Designating the U.S. Ser. No. PCT/CA2004/000705 incorporated by reference the following U.S. Patent Application which is also incorporated by reference herein:

U.S. Pat. application Ser. No. 10/843,256, "Wireless Communications System Incorporating Intelligent Electronic Devices", filed May 11, 2004.

BACKGROUND

In facilities, e.g. buildings or installations, where a significant amount of power is used among a variety of units, it would be desirable to allow the building owner to allocate energy costs to the different units, i.e. consumers, within the facility. For a commercial office building, these units may include the different tenants within the building or the common loads for the facility, such as the elevators or HVAC systems. For an industrial facility, these units may include the different production lines, machines or processes within the facility. As opposed to allocating costs based on a fixed or formulaic approach (such as pro-rata, e.g. dollars per square foot or based on the theoretical consumption of a process/machine), an allocation based on actual measurements using appropriate monitoring devices may result in more accurate and useful information as well as a more equitable cost distribution.

Both installation and ongoing, i.e. operational and maintenance, costs for these monitoring devices are important considerations in deciding whether a monitoring system is worth the investment. While monitoring devices may be read manually, which does not increase the installation cost, manual data collection may increase on-going/operational costs. Alternatively, monitoring devices may be interconnected and be automatically read via a communications link. However, typical communication links require wiring to interconnect the devices which increases the installation cost. In addition, a particular tenant in the building may wish to verify that they are being billed correctly by reading the energy meter or other energy monitoring device that is accumulating their energy usage. This may be a straightforward, although labor intensive and cumbersome, process with a typical energy meter which provides a display viewable by the tenant.

Emerging wireless mesh (or ad-hoc) networking technologies can be used to reduce the installation costs of monitoring devices while providing for automated data collection. Also called mesh topology or a mesh network, mesh is a network topology in which devices are connected with many redundant interconnections between network nodes. Effectively, each network node acts as a repeater/router with respect to received communications where the device is not the intended recipient in order to facilitate communications between devices across the network. Using wireless interconnections permits simpler and cost-effective implementation of mesh topologies wherein each device is a node and wirelessly interconnects with at least some of the other devices within its proximity using RF based links. Mesh networking technologies generally fall into two categories: high-speed, high bandwidth; and low speed, low bandwidth, low power. The first category of devices are typically more complex and costly that the second. Since energy monitoring does not typically require high speed/high bandwidth communication, the second category of devices is often sufficient in terms of data throughput.

Energy monitoring devices may include electrical energy meters that measure at least one of kWh, kVAh, kVARh, kW demand, kVA demand, kVAR demand, voltage, current, etc. Energy monitoring devices may also include devices that measure the consumption of water, air, gas and/or steam.

BRIEF DESCRIPTION OF THE DRAWINGS

FIG. 3 depicts a block diagram of a first procedure retrieving a verified energy reading from the energy monitoring device of the present invention.

FIG. 4 depicts a block diagram of a second procedure retrieving a verified energy reading from the energy monitoring device of the present invention.

FIGS. 7–8 depict exemplary commissioning reports according to one embodiment.

FIGS. 9A–9C depict an exemplary CT locking device.

DETAILED DESCRIPTION OF THE PRESENTLY PREFERRED EMBODIMENTS

Figure 1:
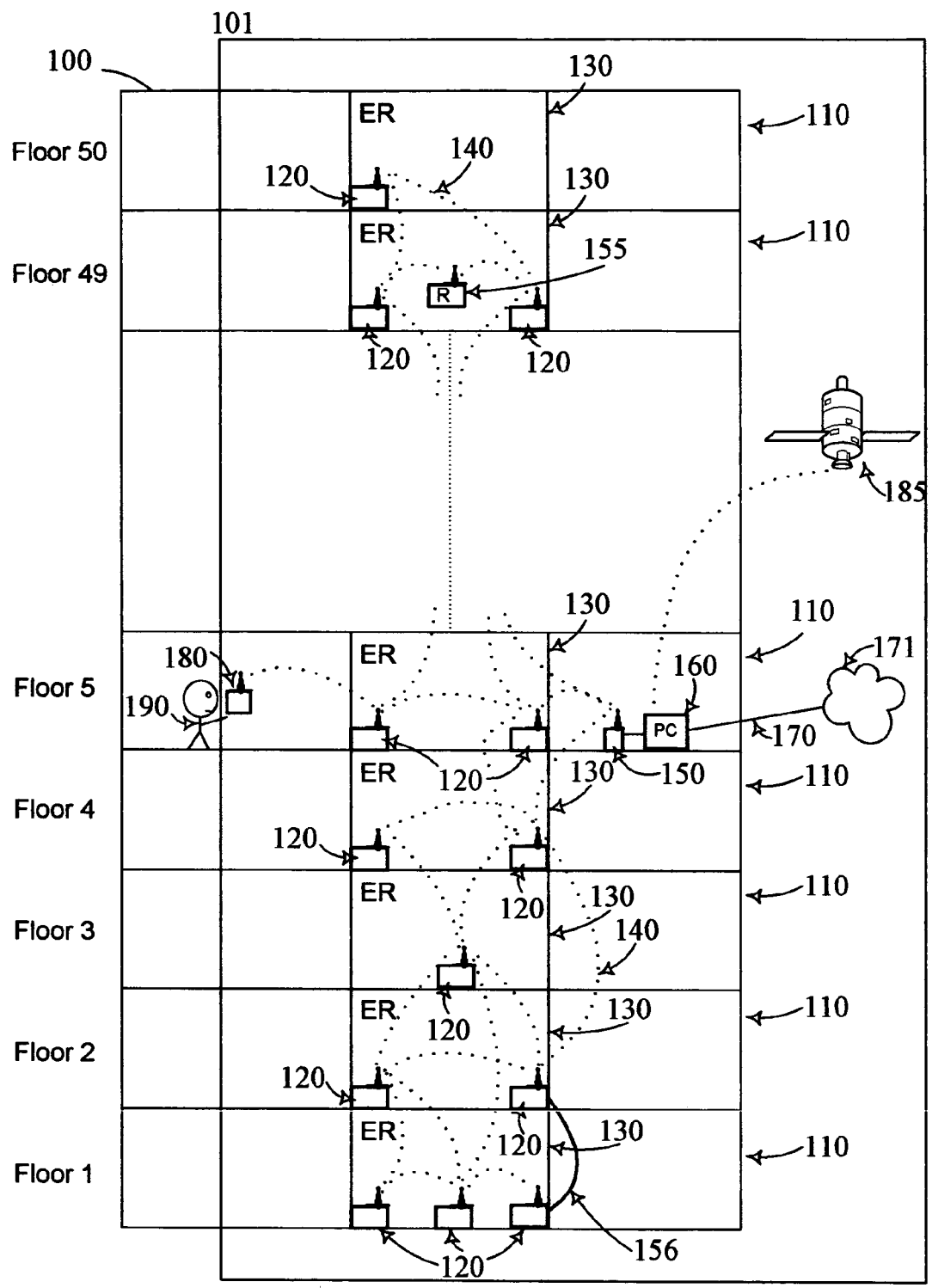
FIG. 1 depicts a block diagram of a commercial building incorporating the system of the present invention.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superceding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

In general herein, a public key is a number, formula, algorithm, function, etc. that is made, or intended to be, publicly available, i.e. made available to any user that wants it. A private key is a number, formula, algorithm, function, etc. that is intended to be kept private and is protected in some way from access. This protection may be in the form of secrecy, an enclosure, encryption, difficulty in access, etc. The more difficult it is to circumvent the protection, the better, however it will be appreciated that the utility of the disclosed examples is not dependent on the quality of the protection the private key.

An energy monitoring device that is designed to transmit its measurement values may not be accessible to be manually read by a person. This may be due to the fact that the energy monitoring device does not have a display or is otherwise physically inaccessible, and although the device may provide a communications pathway (wired or wireline) allowing it to be accessed by the energy provider, the device may not provide a direct communications pathway for the user. This causes a problem in that the user/consumer of the energy being monitored by the energy monitoring device may be left with no way of verifying that they are being billed accurately for the usage that their respective energy monitoring device is measuring. For instance, a configuration error may result in the user being billed based on an incorrect or mis-configured energy monitoring device or the user may simply not trust the energy provider to provide an accurate accounting of energy consumed.

The following description details various mechanisms for verifying the integrity of readings taken from electrical monitoring devices which are in communication with a central computer through a mesh network. It will be clear to those skilled in the art that the mechanisms defined herein are also applicable to monitoring other parameters indicative of energy consumption.

Public/private keys may be used for authenticating a message sent from one computer to another computer over communications pathways such as the Internet. In general, a message can be authenticated by performing a function (such as a hash) on the message data with a private key of one computer. A second computer can then verify the origin of the message by performing a corresponding function on the results of the first function and the message data using the first computer's public key.

FIG. 1 depicts an exemplary commercial office building 100 for use with the disclosed embodiments. The commercial office building 100 has a number of floors 110. Each floor may contain an electrical room 130. Alternatively there may be more than one electrical room 130 per floor or only one electrical room 130 per a number of floors. Within each electrical room 130 there may be one or more energy monitoring devices 120 within an energy monitoring system 101. It will be appreciated that the location of the energy monitoring devices 120 is implementation dependent and that they need not be located in an electrical room 130. The energy monitoring devices 120 communicate among each other to form a mesh network, depicted in FIG. 1 by multiple communications links 140 shown between the energy monitoring devices 120. It will be appreciated that fewer or more communications links 140 may be used between monitoring devices 120 and that the availability of a communications link 140 between any two monitoring devices 120 may fluctuate depending upon conditions such as interference, etc. Repeaters 155 may also be provided to facilitate communications between two devices 120 which may not otherwise be able to communicate due to distance, interference, etc. Alternatively, one device 120 may have two antennas which operate at different power levels, gains, frequencies, modulation schemes, etc. to overcome interference, distance, etc. One of the antennas may be connected to a long cable (such as a coaxial cable) in order that the antenna may be located remotely from the device 120 in a more effective location for transmission/reception than the device 120. Alternatively, the architecture may provide a wireline segment 156 where communications between two devices are not possible otherwise. This may happen due to distance, interference, shielding, etc. The mesh network may use the wireline segment 156 in a similar fashion to the communication links 140. The wireline segment 156 may be implemented using power line carrier techniques over the office building 100 power lines or using standard wireline communications/networking architectures such as RS-485, RS-232, Ethernet, etc.

The device 120 may facilitate the replacement of its antennas such that for a given installation location, flexible, such as rubber encased or flexible wire, adjustable, directional, high gain, or different propagation pattern antennas may be substituted to facilitate more reliable communications. Further, antenna enhancing devices or devices which enhance RF transmission by utilizing proximate structural elements such as metal casings, glass windows, etc., may also be used The mesh network also encompasses a gateway 150 which facilitates communications with a computer 160 or other computing device. The computer 160 may communicate energy data and other data over a LAN 170. The computer 160 and gateway 150 communicate over a serial or other form of communication link. Alternatively, the gateway 150 may interface with the LAN 170 directly and the computer 160 may be connected to the LAN 170 in a different part of the building 100 and communicate with the gateway 150 over the LAN 170. The computer 160 may receive a time reference from a GPS satellite 185. Alternatively, the GPS satellite 185 signal may be received by an energy monitoring device 120, gateway 150 or repeater 155 within the mesh network. In this alternate case, the time within the alternate device becomes the reference for the energy monitoring system 101. The LAN 170 may interface to a WAN 171 such as the Internet. The gateway 150 may, for example, be located in a chief engineer's office where a connection to the LAN 170 is readily available. There may be more than one gateway 150 in the energy monitoring system 101 facilitating extraction of data from the system at more than one point in the mesh network. The gateways 150 may communicate over the LAN 170 to a concentrator that aggregates information from all the gateways.

With present mesh networks it is often difficult to determine the health/status of the network. Typically, only basic information is available from any given node, such as the ability of the node to communicate with the gateway and the signal strength for closest node, both of which give no indication of redundant paths or communication error rates, or other more detailed status information. Often after a network is installed, unhealthy networks, e.g. network with one or faulty links or devices, are identified through missing data or low percentage of responses to requests. The need exists to have an easy low cost way to determine health/status of the network especially during installation of a system.

In one embodiment, a data aggregation device, which may be a portable communications device 180, or other device coupled with the mesh network such as the gateway 150 or computer 160, or software executing thereon, provides the ability to gather network status/statistical information from the mesh network via self/automated reporting by the devices which make up the network. Such self-reported data may include perceived signal strength, delivery delays, multiple or confusing responses, non-responsive or slow responding nodes, communications errors, etc. Further, this data may include both current and historical data collected over a period of time. Such reporting facilitates the identification of weak network links, failing nodes, redundant paths, etc. The reporting may also take place via the display or local communications connection of the particular device to allow a physically proximate user to assess and view the network status as perceived by that particular device. In an alternate embodiment, each device may report the status information of other devices as well, such as other nodes/devices which are proximate to the particular device. At the point of data aggregation, this reported data may be collected/aggregated and reported to a user to present an overall network status of the entire network, or a particular portion thereof, such as by a graphical presentation or the like which shows failing links, links with high error rates, low signal strength, etc. possibly using colors or other visual indicators.

In an alternate embodiment, rather than rely on a self reporting mechanism, or in addition thereto, diagnostic packets may be sent or requested from each node over the wireless link containing data used by the gateway to identify weak or failing links or nodes in the radio network. The diagnostic packets may contain such information as signal strength of all neighboring nodes in priority of use and number of redundant paths. This data would then be used by the gateway to determine if additional repeaters are needed in specific locations. In one embodiment, diagnostic packets are capable of being directed over particular network paths of the mesh network to focus diagnostic activity on particular areas of the network.

Where weak links or troublesome nodes are discovered, measures could be taken to increase communication reliability. For nodes that have weak links to the rest of mesh network, for example communications may be attempted more often in an effort to effectively increase the chances that some of the communications will get through during periods of reliable connectivity and causing the mesh network to seek better links with this device.

Many issues with mesh networks occur upon installation of the network and may be resolved at that time, prior to actual use and reliance on the network. For example, during the installation of a large number of meters, such as can be found on a commercial building meter installation (typically 100 meters or more), a fairly high probability exists that one or more of the devices will be installed incorrectly. Furthermore, some devices may have limited error detection capability due to limitations in their memory capacity/code space and are only be able to detect simple and obvious errors. Typical errors which simpler devices typically detect include: wrong phase connections, reversed CT connection or bad CT and phase connections (open/shorted).

In one embodiment, the capability to generate an automated commissioning report from the different devices is provided. The commissioning report is generated by first obtaining assorted real time device data from all of the operating devices and then analyzing the real time values for validity. The real time device data may include RMS current and voltage readings, frequency, apparent (VA) power, real (W) power and reactive (VAR) power and power factor. Using a combination of these values, in conjunction with the measuring mode (delta or wye), angles can be determined between voltage and current phases. For example, if the real power is negative and in the installation it is known to be positive, i.e. since power is being delivered, this may indicate that the current transformer ("CT") could be reversed. For devices that can automatically compensate for a reversed CT, a warning would be provided indicating that the CT phase is reversed.

In this embodiment, every device in the installation is automatically interrogated when the device is initially detected in order to provide an entry for the commissioning report. Expert system software is provided at the point of data aggregation which uses common sense relationships to analyze the data and determine if the readings are reasonable. The installer will go over the commissioning report and evaluate each error or warning for validity. For example, if voltage and current from I2 are reported to be zero on a floor/panel, and the installer knows there are no loads on the circuit, then the reading is reasonable. However if there is expected to be a reading, then there is something wrong with the CT, connections or configuration and the installer can take corrective action. An exemplary table based commissioning report is shown in FIG. 7.

The commissioning report may be further enhanced by providing relative phase angles between all the current and voltage phases. This information may be provided by a device such as the ION 6100 power meter, manufactured by Power Measurement, Ltd., located in Saanichton, British Columbia, Canada. Using the phase angles, swapped current or voltage phases may be easily determined. To simplify the presentation, the commissioning report may simply provide a vector diagram (as found on ION 7500 power meter, also manufactured by Power Measurement, Ltd.) for each device with an appropriate OK, WARNING or ERROR message. This would reduce the clutter of a large number of real time reading values. FIG. 8 shows an exemplary vector based commissioning report.

The installation of mesh networks using monitoring devices, such as the ION 6100 mesh network based power meter, can be complicated by intermittent network connections due to marginal transmission and reception of data over the network. Typically, during the commissioning of the system, all that can normally be done is to verify that each device in the network communicates with a central gateway. This verification simply tells the installer that the system is currently working properly, but it does not tell how much operating margin the radios have. For low cost devices, it is usually not feasible to include measurement of signal strength.

The operating conditions of a mesh network radio can change due to near body effects, temperature, interference, fading and multi-path, etc. If node reception, i.e. signal strength or connection quality, is close to the operating limit of the radio, then small changes of the operating conditions may render a node non-communicating.

In one embodiment, the use of a variable power mesh network node is provided to validate the correct operation of the system at a reduced power level. During commissioning, the system is switched to a lower power mode which operates the radios at a lower power level than the radios are normally capable of. Once the system has been verified to be fully operational (which may require the installation of appropriate routers to complete the network), the system is switched to the normal operating mode at the normal radio power. During normal operation, the mesh network node power will be increased to a higher (normal) power level assuring that the reception and transmission of mesh network data is well above any marginal radio operating parameter.

In yet another embodiment, the monitoring devices feature the capability to be located a inside or proximate to a circuit breaker with the monitoring device's current transducers being coupled with the breaker's loads and sending data to the monitoring device/meter. The current transducers also feature mesh network capability, i.e. RF communications capabilities as described herein, and communications between the device/meter and the current transducers is accomplished via a mesh communications network or other medium. In this embodiment, the device/meter is physically configured to fit within a particular form-factor of the breaker panel.

In yet another embodiment, the mesh network may include nodes mounted to elevators, or other moving mechanical systems, and utilizing the movement of the elevator to bring the elevator-mounted node within a communications-proximity to portions of the mesh network which are otherwise inaccessible. The elevator mounted node may act as a store and forward device facilitating communications between other network devices as connections are established and lost due to its movement. The elevator mounted node may store data from particular devices until the elevator moves to another location where forwarding of the data is possible or alternatively, the elevator mounted node may use alternate communications means such as higher power RF or wireline communications to forward the data.

In yet another embodiment, the mesh network of monitoring devices further include a capability to share common area usage charges based on actual or more closely approximated usage of common areas. The monitoring devices or central aggregation device may feature the capability to discern usage of common areas by particular tenants, or at least make approximations of such usage. Where reasonable approximations of particular tenant usage may be determined and associated with particular consumption, that consumption may be appropriately charged to the particular tenant. For example, power consumption by the elevators may be apportioned to tenants by the floors which they occupy such that a tenant which occupies multiple floors or is a frequent elevator user is apportioned a more appropriate amount of the charges associated with operating the elevators. Other methods of approximating particular tenant usage of common areas may rely on building access identifications cards and their use at particular access points throughout the facility or RF enabled identification badges which permit tracking of tenant movement throughout the facility. Further, temperature sensors, or other coupling with environmental control systems, may be provided to measure HVAC usage in particular areas to properly apportion those costs.

A user 190 may transport a portable communication device 180 around the building 100. This portable communication device 180 may be used to read energy registers from the various energy monitoring devices. The portable communication device 180 and the energy monitoring device 120 may both have indicators (such as LEDs) on them that light, or otherwise signal, when communication is established between the two devices. This indicates to the user that they are in communication with the correct energy monitoring device 120. In addition, the portable communication device 180 may read a secondary register from the energy monitoring device 120 which is a hash of the energy registers and a pattern such as the private key of the energy monitoring device 120. If the pattern is known only to the energy monitoring device and a system such as a billing system within a utility, the registers within the portable communication device will be difficult to tamper with without detection. The secondary register may appear to the user of the portable communication device 180 as just another register such that the user is not aware that the secondary register may be used for tamper detection. The portable communication device 180 may be a handheld meter reader.

In one embodiment, a handheld device is provided for performing network/device related tasks, such as optimizing monitoring device (or antenna) locations for optimal communication performance, performing routine monitoring of network status, determining or monitoring for specific device availability or activity, determining device locations (by proximity or by using GPS capabilities), communicating with devices via the mesh network and/or direct/local device interfaces, such as for setting up/initializing devices, and acting as a mesh enabled data display.

When installing wireless meters/nodes it may be advantageous for the electrician or commissioning engineer to have a separate handheld radio that is used to determine suitable positioning of the devices being installed. The handheld radio would be able to communicate with the network being installed and have a faster rate of communication with the gateway 150. The rate of communication with the gateway 150 could be configurable to suit all sizes of networks. The handheld radio may have a display or some other user interface such as LED's to help determine radio link quality into the network.

Alternatively each device being installed could have a deployment mode where its rate of communication to the gateway 150 would be faster for a period of time, thereby giving the installer more feedback as to the success and quality of the installation. The device could have a button that is used to activate the deployment mode for this period of time. The installer would then be able to move the device around until a suitable position is found, with the device and/or gateway determining and reporting the status of the communications link at a more frequent rate than might be had in the normal operating mode. The installer would be aware of a suitable position through data reported by the device, such as via LED's or the display on device. Deployment mode may only last for a period of time that is sufficient to find acceptable location and communicate with the network. The deployment mode may automatically shut off to prevent installed devices being left in deployment mode.

In both of the cases above the network would have to be installed as follows:

The gateway 150 is installed.
1. Devices can then be installed from the gateway 150 out so that as each device is installed, they are able to communicate with the gateway 150; and
2. If it is not possible to install the devices, then temporary repeaters are put in place of where devices or repeaters will have to be installed to complete the network.

Alternatively, the gateway 150 may have a deployment mode where statistics are gathered for each node in the network. The gateway may perform ping statistics on nodes, request diagnostic packets containing such things as signal strength, # of hops etc. After meters are installed, the gateway would then have to be taken out of deployment mode to gather energy information.

Locating installed devices may prove to be difficult especially if a meter is installed in a location different than the intended location. To assist in locating devices each meter could be outfitted with GPS chips. The location of the device could then be reported through the wireless link. A handheld GPS unit could then be used to assist in locating the device.

Figure 2:
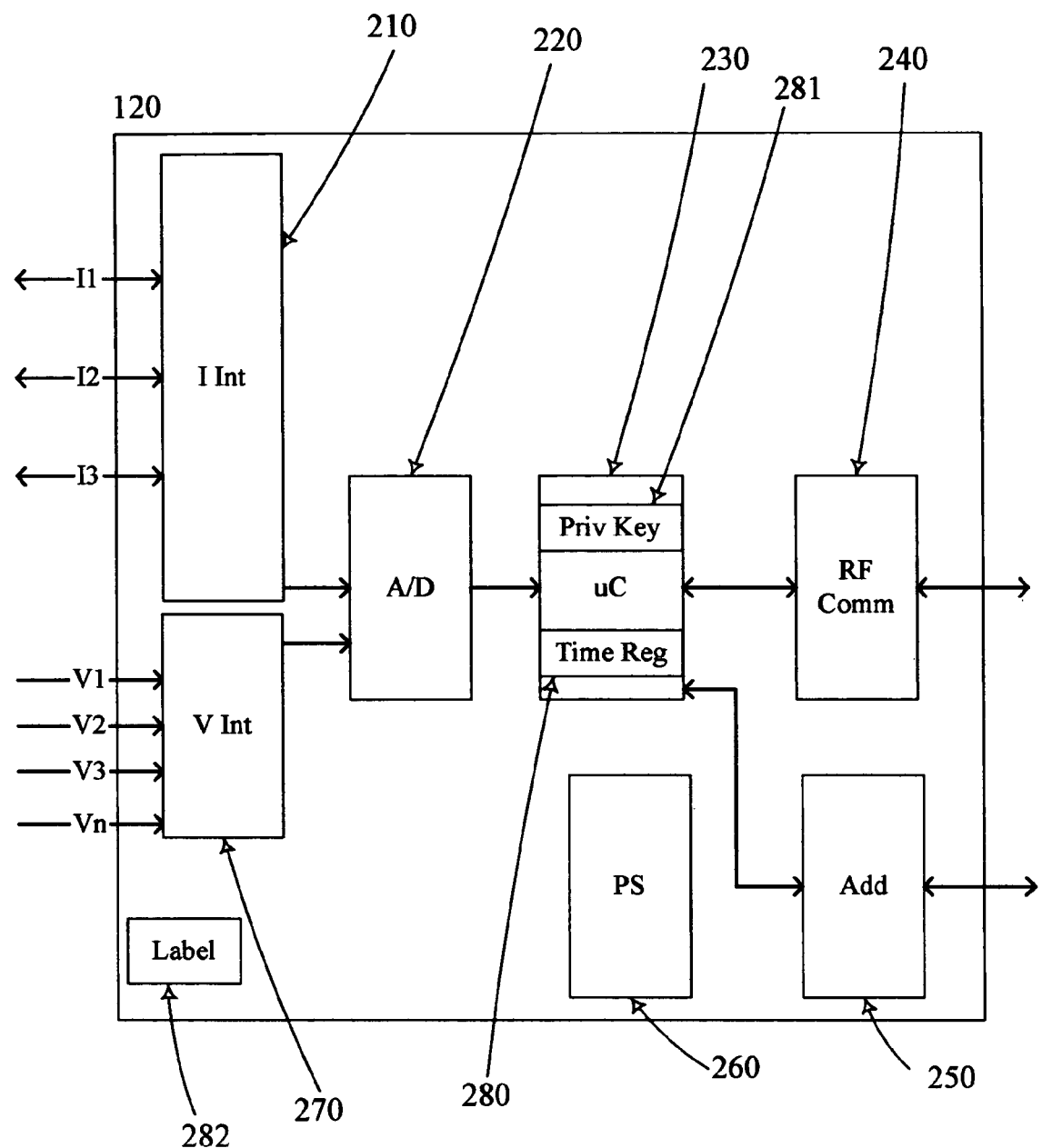
FIG. 2 depicts a block diagram of the internal circuitry of an example of an energy monitoring device of the present invention.

FIG. 2 shows a block diagram of an energy monitoring device 120 according to one embodiment. The energy monitoring device 120 includes electrical current interface circuitry 210 and electrical voltage interface circuitry 270. The electrical current interface circuitry 210 and electrical voltage interface circuitry 270 are operative to interface with power conductors which supply electrical energy to a certain load or area of the building 100. This interface may be direct or through appropriate current or voltage transformers. In alternative embodiments, the energy monitoring device may lack either the electrical current or electrical voltage interfaces 210, 270 depending upon the implementation and monitoring requirements of the device 120. The energy monitoring device 120 further includes an analog to digital converter 220, a micro-controller 230 coupled with the analog to digital converter 220, and RF communications circuitry 240 coupled with the micro-controller 230. The electrical current interface circuitry 210 and electrical voltage interface circuitry 270 scale the signals from the power conductors to voltage levels compatible with the analog to digital converter 220. The analog to digital converter 220 provides digital representations of the voltage and current in the power conductors to microcontroller 230. Using these signals, the microcontroller 230 calculates at least one power parameter such as kWh, kVAh, kVARh, kW demand, kVA demand, kVAR demand, etc. The microcontroller 230 transmits this power parameter through RF communications circuitry 240 through the mesh network and gateway 150 to computer 160. The computer 150 may send configuration and command data (such as demand reset) to the energy monitoring devices 120 through the mesh network. The microcontroller 230 also maintains time for the energy monitoring device 100 in a memory register 280 which may be internal to and/or external to the microcontroller 230. The microcontroller 230 also maintains a private key 281 in internal and/or external memory. The energy monitoring device 100 also contains a power supply 260 which may interface to the same voltage signals as the voltage interface circuitry 270 or to an alternative power source. The power supply 260 may incorporate a battery or capacitor to facilitate operation when operating power is lost. The power supply 260 may also incorporate crystal radio type circuitry as an alternate source of operating power such that RF power present from local AM radio stations may be utilized to power the energy monitoring device 120. Additional circuitry 250, such as wireline communications, I/O circuitry, etc. may also be provided in the energy monitoring device 120. A label 282 is provided on the outside of the energy monitoring device 120. The label may provide the public key corresponding to the private key 281. Alternatively, the public key may be shown on a display coupled to the microcontroller 230 or periodically broadcast over the communications links 140 forming the mesh network, either automatically or in response to a request. In one embodiment, the public key and associated private key may be periodically changed by the microcontroller 230. The microcontroller 230, may use A/D 220 readings, RF noise readings, etc. as random numbers to generate these public/private key pairs or, alternatively, the key pairs may be inserted during manufacture or may be input to the energy monitoring device 120 using other methods.

Figure 11:
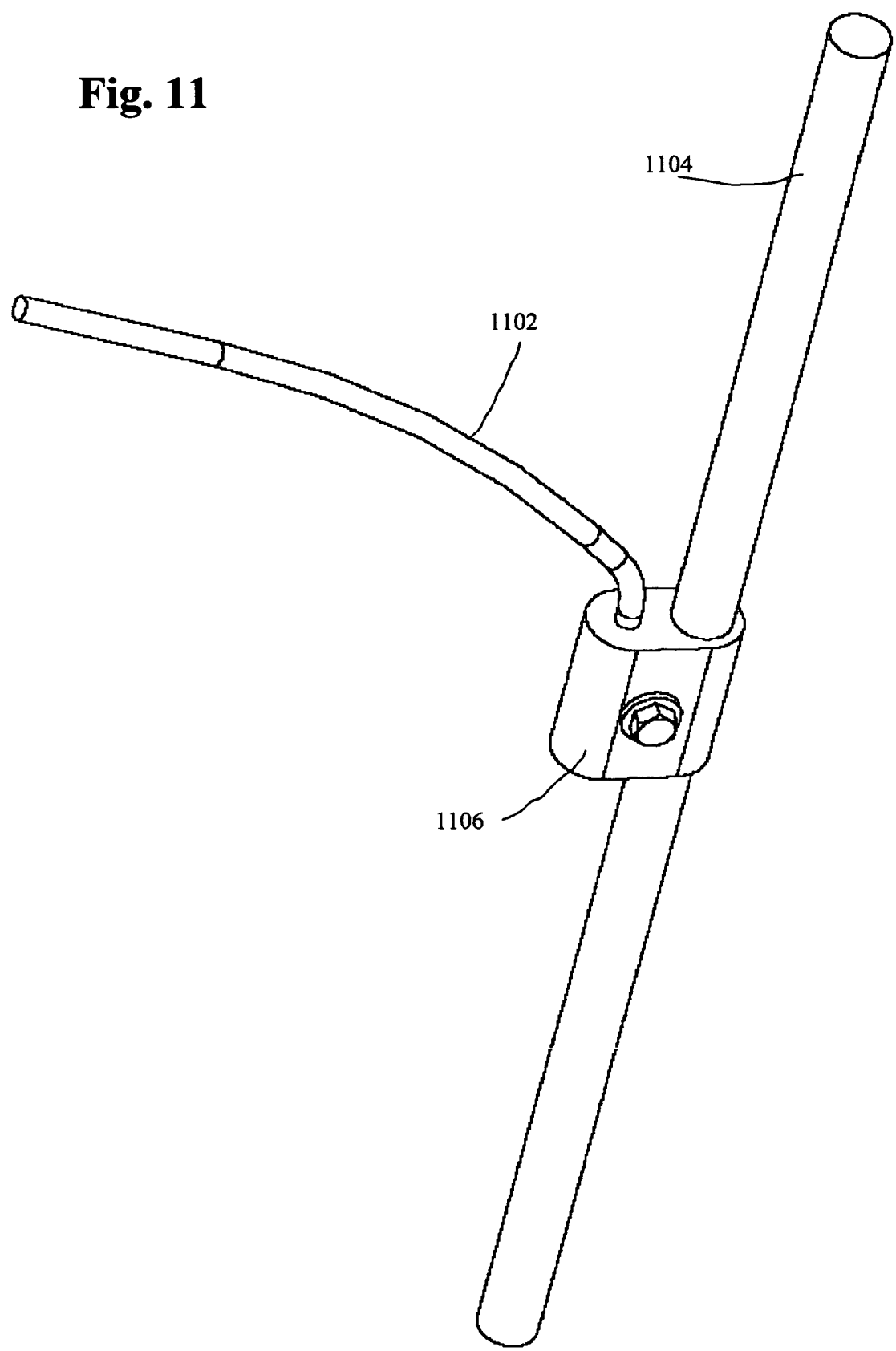
FIG. 11 depicts an exemplary voltage displacement device for use with the disclosed embodiments.

In one embodiment, a voltage displacement device is utilized to allow any piece of monitoring equipment to be connected to a voltage conductor without the need to power down the line to be monitored. This piece of equipment could be an integral part of the monitoring devices voltage leads or a separate device that would allow for a galvanic connection between the voltage source and the monitoring device. An exemplary voltage displacement device 1102 is shown in FIG. 11 attached to a power line 1104. The voltage displacement device 1102 pierces the power conductor 1104, in a safe and insulated manner, to provide a means of powering the monitoring device as well as providing a signal to monitor and/or measure. The device 1102 is clamped and locked to the power conductor 1104 utilizing a locking/clamping mechanism 1106 in a manner that would require a tool for removal, thereby preventing unauthorized persons from tampering or removing the connection. Even when local electrical codes, procedures and/or standards require powering down a conductor before adding a connection to it, the voltage displacement device may save installation time and cost since no splicing, terminal connections, etc. are necessary to make the connection.

In one embodiment, a power meter is provided which includes multiple radios for redundant operation in case of a failure or to facilitate communications over multiple RF channels simultaneously. Alternatively, a low power and a high power radio, possibly similar to the low/high power radio described above for device installation, may be provided, wherein the device determines the optimum radio to use based on ambient environmental conditions, time of day or other trigger.

If, for some reason, nodes in the main radio network stop communicating energy/power data there may be an alternate method to extract data manually or through some other low cost method. Due to the nature of mesh networks if nodes in the middle of the network lose power, all nodes that communicate through those nodes may also stop communicating. Using a point to point radio technology would enable a person to go from floor to floor collecting energy/power data from the non-communicating devices until the mesh wireless network problem is resolved. In particular the second radio technology could be Bluetooth, 802.11x (a, b or g), infrared, or similar networking technology, so that the data collector could use a handheld device to communicate with a single device if the address is known (point-to-point).

In one embodiment, the gateway device 150 may provide a firewall capability, or this capability may provided by a separate device logically located so as to be able to control and contain network traffic, which prevents unauthorized access to the mesh network from an external network, such as via the gateway device. The firewall device may further permit limited unauthenticated wireless access or limit access based on the level of security or level of trust in a given entity or method of access.

Often in establishments, the department responsible for internal networks will be wary of attaching devices to their internal network. However, this department may be receptive to providing a network connection to a demilitarized zone or directly to the internet. In this case the firewall within or coupled to the gateway protects the gateway 150 and mesh network devices from unauthorized access. The gateway may report to the computer (which may be within the corporate network) through protocols such as SMTP, HTTP, etc. which most corporate firewalls do not block.

Often there is no Ethernet connection where the gateway is to be installed. Instead of running a wired connection to the demilitarized zone, a secure wireless technology such as WI-FL may be used.

In yet another alternative embodiment, the capability for a monitoring device or other node to act as a gateway for legacy devices, which do not feature the capability to communicate via the mesh network, is provided. The gateway-enabled device may act as a simple conduit allowing bi-directional communications with the legacy device as if the legacy device were itself on the network. This may be accomplished via protocol encapsulation. Alternatively, the gateway-enabled device may act as a master device, server or other intermediary which mediates communications between the network and the legacy device(s). For example, the gateway-enabled device may aggregate data retrieved from multiple legacy devices and pass the aggregate onto the network.

In RF challenged zones, i.e. where RF based communications are difficult, or for supporting legacy devices, it may be desirable to communicate to meters via the RS-485 serial bus. In one embodiment, a gateway device is provided that supports both wireless technology and multiple/single RS-485 connections for legacy devices or in areas were wireless does not work. The gateway device, as described, may act as a single data collector for multiple nodes communicating via RS-485 and wireless links. The gateway device may be an application specific device for bridging other devices onto the mesh network or may be an additional function provided by a mesh network node, such as the monitoring device described above.

Figure 6:
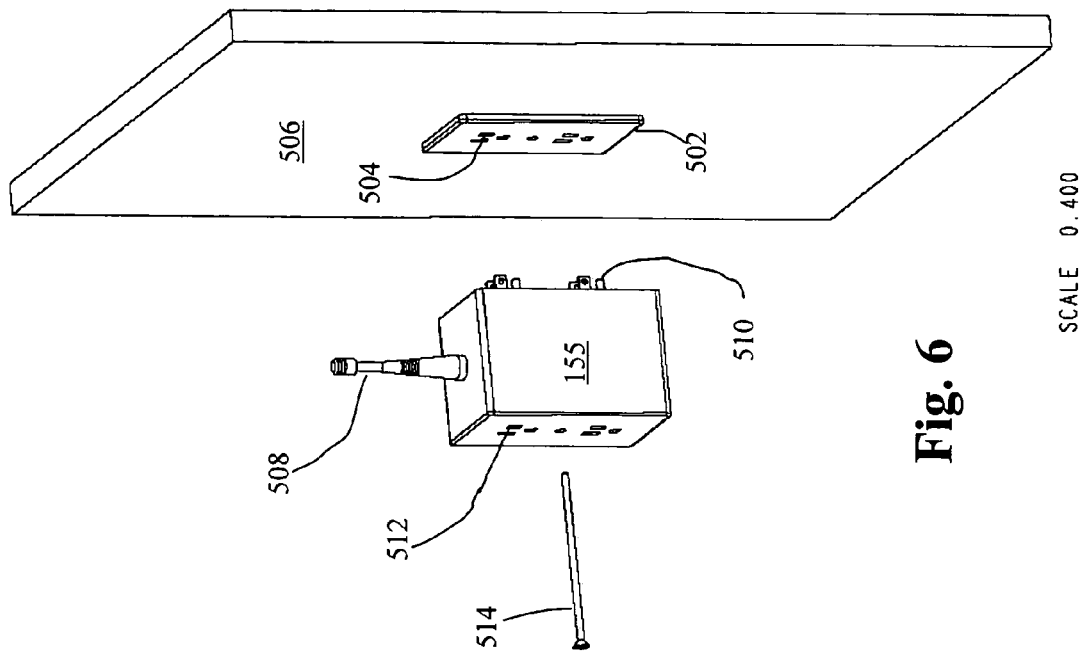
FIGS. 5–6 depict an exemplary method of mounting a monitoring device according to one embodiment.
Figure 5:
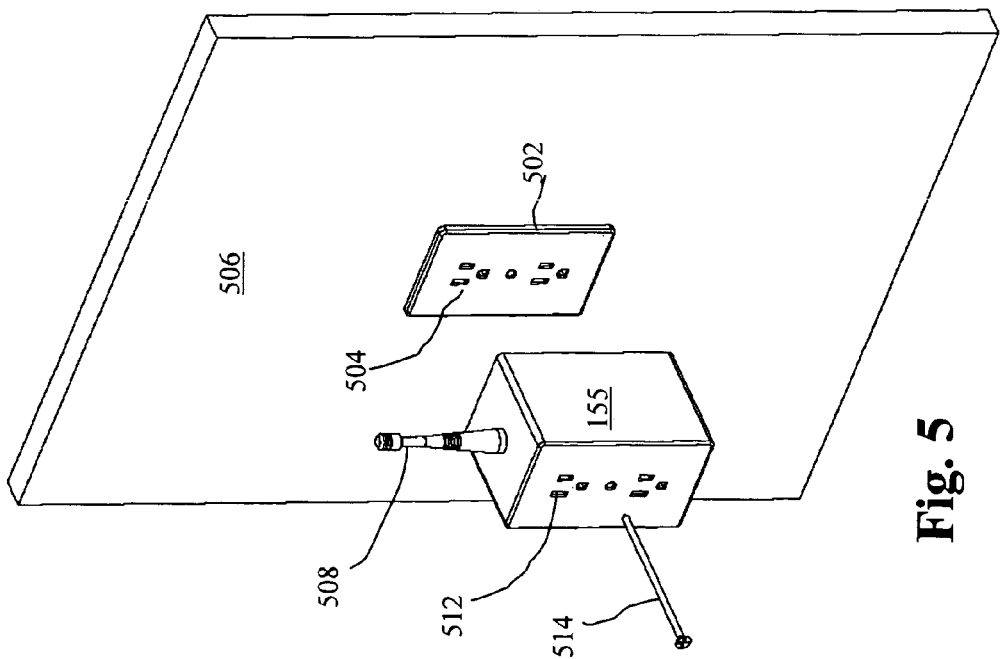

In yet another embodiment, a monitoring device or other node device is provided with flexible power options allowing it to draw operating power from various sources, without interfering with those power sources. This adds to the flexibility of the device to be placed in locations which may not have convenient sources of operating power, the sources of operating power may not be reliable or stable, and/or the sources of operating power are the same as that being monitored and isolation of the device is desirable. Such sources of electrical power may include emergency power sources such as power for exit or emergency lighting systems, solar power (via a window or ambient lighting), telephone system power, battery power, RF power (similar to the operation of Radio Frequency Identification Devices ("RFID") or crystal radio sets) or combinations thereof. In this way, there is reasonable assurance that the device will receive a constant uninterrupted supply of operating power. Such devices may be further provided with flexible mounting options such as the ability to be mounted to a light bulb socket or wall socket/outlet. The ability to lock the device in place and draw operating power therefrom may also be provided. An example repeater 155 that may be plugged into a wall 506 outlet 502 having one or more power sockets 504 is shown in FIGS. 5 and 6. The repeater features an antenna 508 and power connectors 510. In this configuration, the repeater 155 draws power from at least one of the sockets 504 and is secured in place with a replacement screw 514 for the wall outlet 502. The repeater 155 can thus not easily be removed either accidentally or intentionally. The screw 514 may incorporate a one-directional drive engagement to further discourage removal. The repeater 155 may also provide pass through outlets 512 such that the outlet 502 can still be used. In an embodiment which fits into a light socket, a pass through socket may be provided to allow the socket to be used for illumination purposes.

Figure 9A:
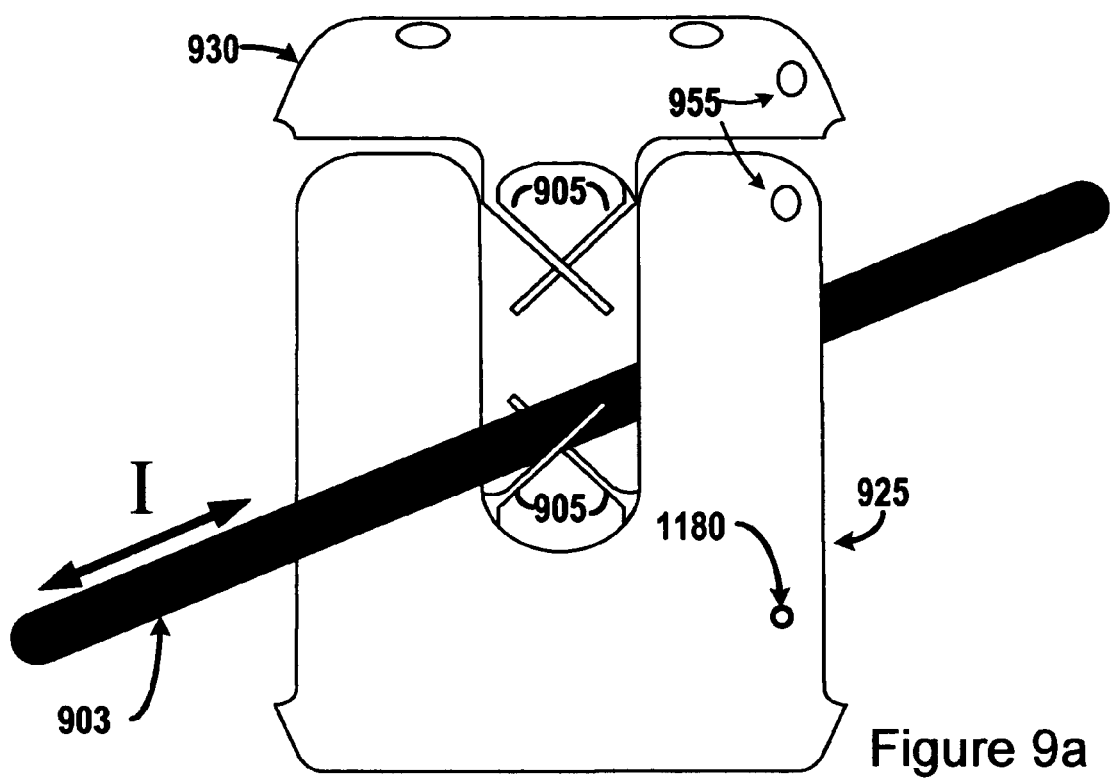
Figure 9B:
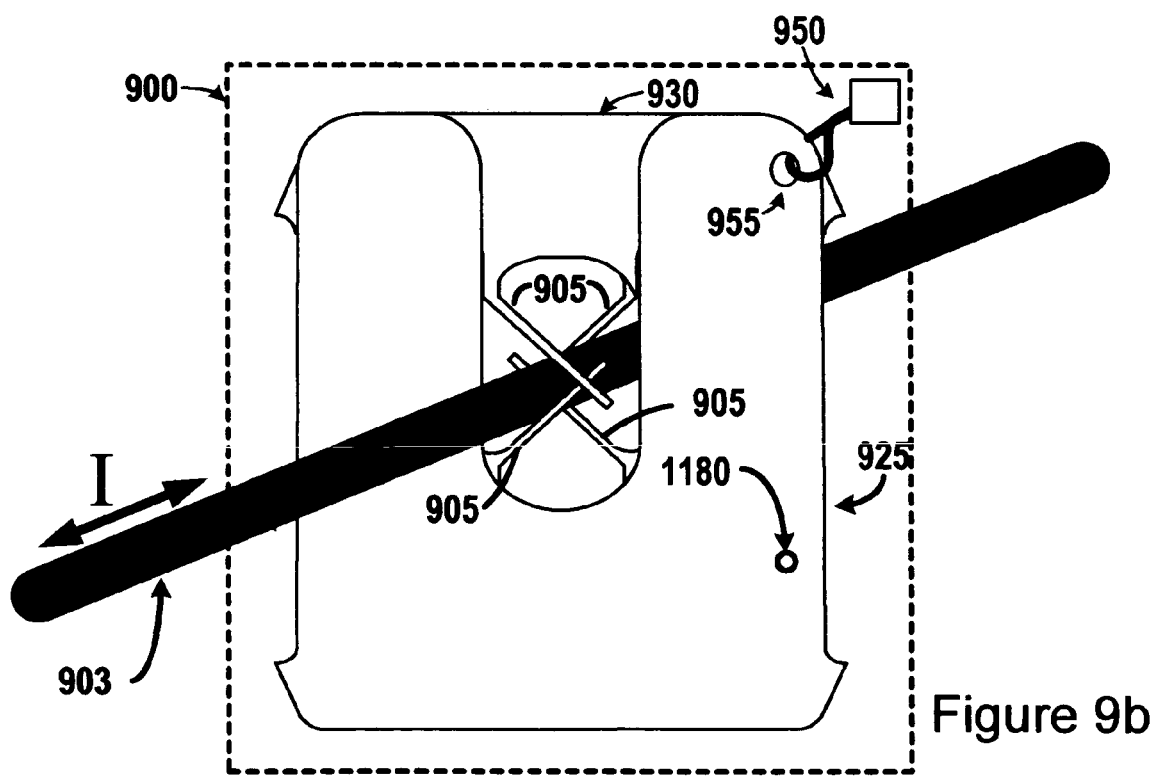

In one embodiment, mesh network enabled current transducers or transformers ("CT's") include a physical security mechanism to prevent or indicate tampering and/or removal of the CT from the power line being monitored. FIGS. 9A–9C depicts an exemplary CT 900 having a revenue lock mechanism 955. Effectively, the CT includes two interlocking portions 925 930, each of which come together to encircle the power line 903 to measure the current passing there-through. The interlocking portions 925 930 each feature a locking hole 955. The locking holes 955 of each portion come into alignment when the portions 925 930 are assembled around the power line 903 thereby allowing a sealing device 950, such as a lock or locking wire, to be fed through both holes 955 preventing removal of the CT without breaking the locking mechanism 950 and/or causing indication of tampering.

In yet another alternative embodiment, the capability to update and/or modify the firmware of a monitoring device or other mesh network node via a mesh network is provided. In operation, the particular monitoring device(s) or other mesh network node(s) to be upgrade/modified may be instructed to enter an upgrade/modify mode. Upgraded or modified software/firmware may then be transmitted via the network to the device as one or more packets. The device(s) receives and assembles these packets into a memory, re-requesting packets that are received with errors and determining and re-requesting missing packets. Once the new code has been fully transferred, the device is instructed to begin executing the new code. Prior to executing the new code, the device may validate or otherwise authenticate the code and may further perform functions to ensure that the device can recover should an error occur, such as by performing a data backup operation. In an alternate embodiment, the special upgrade mode is unnecessary. In this case, the packets of new code contain an indicator to the device as such. When the device sees such packets, it writes them to its memory store and assembles the complete code, re-requesting errant packets and tracking and re-requesting missing packets. Once all of the packets have been received, as determined by an indicator which tells the device how many were to be received or by an packet denoted as the last packet sent, the device automatically switches over to the new code. Prior to switching over to the new code, the device may validate the new code, or otherwise perform an authentication. Further, the device may perform a backup operation of any stored data to ensure that recovery is possible if an error occurs.

In one embodiment, a monitoring device is provided which is capable of utilizing assumed voltage readings in situations where it is not possible to determine actual voltage readings from the circuit being monitored. This capability allows the monitoring device to operate until it becomes possible to connect it to the voltage terminals of the circuit to be monitored, or operate indefinitely without connection to the voltage terminals, depending upon the application. When installing the energy monitoring device 120, it is often necessary to power down the circuit to be monitored so that voltage connections can be made to the energy monitoring device. Otherwise, the installer may be exposed to hazardous voltages and/or the device 120 may experience an unexpected power surge on its inputs upon connection, thereby damaging the device. However, installation of the current connections can often be accomplished with the circuit energized when using non-contact sensors, such as "clamp-on" CTs which rely on induced current flow, as the risk of injury or damage is lessened.

Therefore, the energy monitoring device 120 according to the present embodiment provides the ability to estimate power and/or energy readings when only the current inputs are connected. As described, this estimated-operation may be used on a temporary or permanent basis. If used on a permanent basis, the energy monitoring device 120 may be provided without voltage inputs so as to lower manufacturing costs. This may occur, for example, where the application demands may be met using assumed voltage values and, accordingly, the user does not wish to pay for or install fully functional devices 120.

Figure 13:
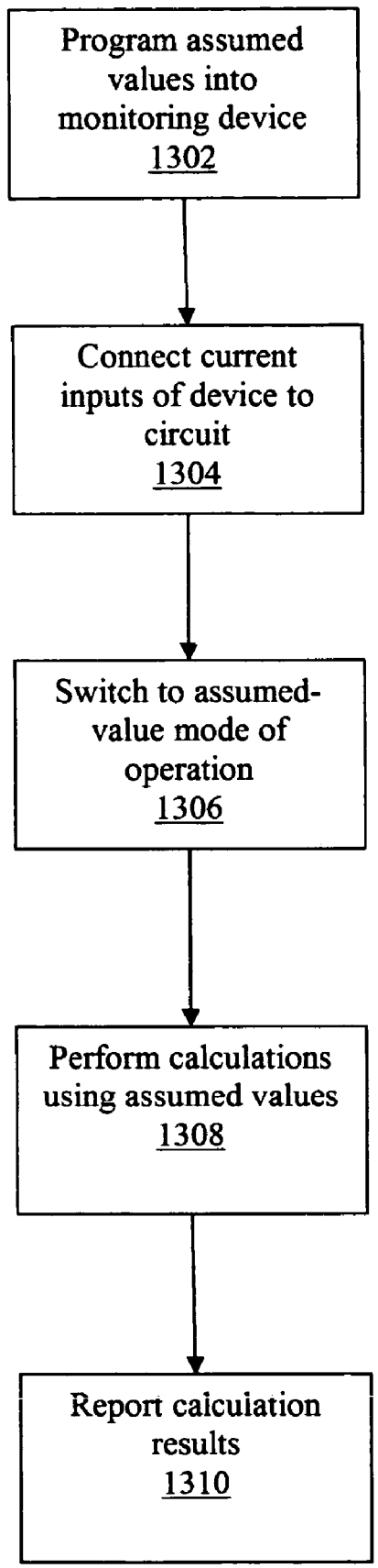
FIG. 13 depicts an exemplary process for using assumed data values in computations according to one embodiment.

In order to estimate power and/or energy readings, several techniques may be used. In one embodiment shown in FIG. 13, the energy monitoring device 120 may be programmed with an assumed voltage and/or power factor based on the particular load it is monitoring (1302). The device 120 may be programmed prior to, or after, connecting the current inputs to the circuit to be monitored (1304). The assumed value(s) is/are stored in a memory within the device and used by the processor as the basis for computing other data regarding the monitored circuit, as will be described. Programming assumed values into the device 120 may be accomplished directly using direct communications inputs provided by the device 120 or through the mesh network or other network communications input. Once programmed, the device switches into an assumed-value mode of operation, either manually or automatically, as described above (1306). The assumed voltage and/or power factor values may then be utilized by the device 120 to perform the requisite power and/or energy calculations (1308). The computed results may then be reported as per the normal operation of the device 120 (1310). As noted above, the reported results may include an indicator which indicates that the calculations were based on assumed values and may further indicate a margin of error as such. In an alternate embodiment, multiple power factors, for different load currents, are provided and the energy monitoring device 120 interpolates between these power factors based on the current present in the circuit being monitored. For example, the energy monitoring device 120 may be provided with an assumed voltage of 480V AC, and an assumed power factor of 0.84 at full load current (e.g. 40 Amps), an assumed power factor of 0.8 at ¾ load current and an assumed power factor of 0.72 at ½ load current. The energy monitoring device 120 may then interpolate the power factor to provide interpolated values for use in power and/or energy calculations based on actual current values which may range between the programmed assumed values or outside of them.

Figure 10:
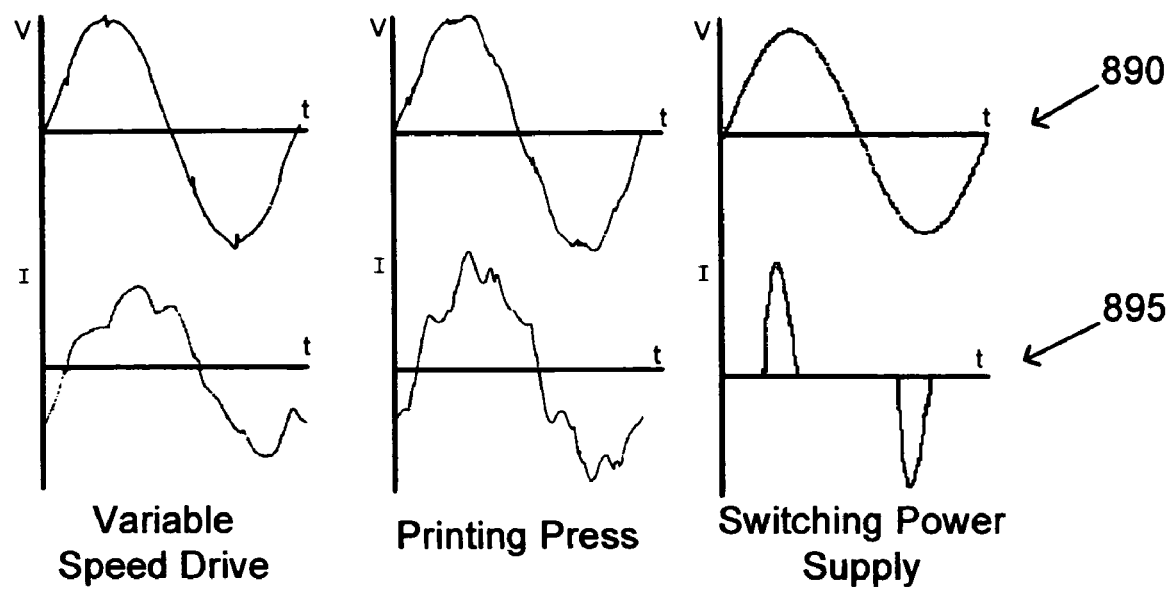
FIG. 10 depicts exemplary voltage waveforms and time relationships for several possible current waveforms according to one embodiment.

Alternatively, the energy monitoring device 120 may be programmed with an assumed voltage waveform and time relationship to the actual waveform representative of the actual current present in the circuit being monitored. FIG. 10 shows several example voltage waveforms and time relationships 890 for several possible current waveforms 895. The energy monitoring device may use techniques such as fuzzy logic; artificial intelligence, point by point comparison, etc. to determine the closest match current waveform in a stored suite of waveforms and then use the corresponding voltage waveform including the assumed phase or time relationship to the current waveform in power and/or energy calculations. In yet another alternative embodiment, an assumed voltage magnitude may be programmed into the energy monitoring device 120 over the mesh network or the energy monitoring device 120 may be manufactured for a given voltage. This voltage magnitude may then be applied to the assumed voltage waveform during the calculation of power and/or energy (ie., each point in the assumed voltage waveform may be multiplied by a constant such that the rms value of the voltage waveform used in the power/energy calculations is the same as the voltage magnitude provided).

Further, when the monitoring device 120 is operating using assumed voltage data, an indicator may be appended to all calculation results to indicate to a user or a data aggregation system that the data that the monitoring device 120 is producing is based on assumed values. Further, a visual indicator on the monitoring device 120 itself may indicate such operation as well.

In one embodiment, the assumed values are stored in a memory within the device 120 and referenced by the device 120 for performing calculations as described when the device 120 is placed in a "assumed voltage" mode of operation, either automatically or manually by a user via the device's 120 user interface or remotely over a network. This mode of operation may automatically be activated when the device 120 is suitably programmed with assumed data values and the device receives inputs on its current inputs but not on its voltage inputs, such as when the voltage inputs are not connected or the inputs or connections to the circuit fail or otherwise become disconnected. Further, the assumed values may be stored as digital values which bypass the device's 120 analog to digital converter to be directly input into the processor of the device 120 or the assumed values may be stored in an analog form and act as pseudo inputs to the analog to digital converter when actual voltage measurements are not present. In one alternative embodiment, assumed voltage values are input into the monitoring device 120 by attaching a dummy voltage generator to the voltage inputs of the device 120 to feed an assumed voltage value to the device 120. This has the advantage of allowing the use of assumed voltage values on older devices 120 which lack the capability to be programmed to do so.

In addition to using the steady state current waveform to determine an appropriate voltage waveform and/or phase relationship to assume, the energy monitoring device 120 may analyze current waveforms during startup conditions, transients, surges or sags in current level to determine the type(s) of loads that are being powered. Assumed steady state voltage waveforms/phase relationships may be selected based on these conditions only or in combination with steady state current readings. Refer to PCT International Patent Application Designating the U.S. Ser. No. 04/23006 entitled "METHODS AND APPARATUS FOR MONITORING POWER FLOW IN A CONDUCTOR", (Attorney Ref. No. 6270/149) filed Jul. 16, 2004, herein incorporated by reference.

Several procedures for retrieving energy related data from energy monitoring devices 120 in the building 100 will now be discussed. It will be appreciated that the described procedures may be used alone or in combination without departing from the spirit and scope of the invention FIG. 3 shows a first procedure for retrieving energy related data from an energy monitoring device 120. The energy monitoring device 120 may be installed and interfaced to voltage and current signals (block 300) in order to monitor or measure at least one power parameter (block 310). The power parameter may be kWh, kVAh, kVARh, kW demand, kVAR demand, kVA demand, voltage, current, etc. The energy monitoring device contains a number of registers which store various measured and computed data values. This installation may be in electrical room 130 or any other appropriate installation location. The energy monitoring device creates a security register data (block 320) and stores this data in a security register in the device 120. This security register data is created by the operation of the private key 281 on the measured power parameter(s), for example, the private key 281 may be hashed together with the measured power parameter(s). The private key 281 may be any of the pieces of information described above. The register (including the security register) contents are then retrieved from the energy monitoring device 120 (block 325). The registers may be retrieved using any appropriate method. Some example methods include reading with a portable computing device 180 over a wireless link, manual recording on paper or into a handheld device or direct communication over a communication link to a central computer. The retrieved register contents are then returned to the utility or other entity that bills for energy usage (block 330). This may be accomplished by returning the paper or portable computing device 180, or storage media therefrom, to the utility or receiving the register contents over a communications link at the utility. The register contents, including the security register data from the security register, are then downloaded into a computer (block 340) where the register contents are authenticated using an appropriate public key (block 350) or using a shared private key. The public key may be any of the pieces of information described above.

Using this procedure, the possibility of an individual (such as a meter reader) tampering with energy readings is reduced due to the fact that the individual would either have to know the private key of the device, or be able to compromise the particular public/private key algorithm used in order to change the energy readings without detection.

FIG. 4 shows a second procedure for retrieving power parameters from an energy monitoring device 120. This procedure may be appropriate for use when a consumer of energy wishes to verify that they are being billed correctly for energy usage. The energy monitoring device is installed and monitors at least one power parameter (blocks 300, 310) in a similar fashion as described in the previous procedure. The energy monitoring device 120 signs the power parameter(s) (block 400) utilizing a digital signature and transmits the power parameter(s) and signature over the network (block 410). As used herein, to "sign", or alternatively, "digitally sign", a message/document means to generate or otherwise append a "digital signature" to the message/document. A digital signature is an electronic signature appended to a message/document that can be used to authenticate the identity of the sender of a message/document, the signer of a document/message, ensure that the original content of the message/document that has been sent is unchanged and/or prevent repudiation of the document's/message's contents by the sender. The signed document/message, with or without the digital signature may, but need not, be encrypted, either before or after signing. A digital signature is typically generated based on the contents of the document/message and the sender's private key of the public/private key pair. Upon receipt, the receiver of the message "authenticates" the message contents using the sender's public key. The network may be the mesh network previously described wherein the packets are transmitted via other energy monitoring devices or any other appropriate communications means. This information is received by a computer which makes the information available to a consumer of energy (or other entity that wishes to verify energy readings). For example, the information may be made available by way of a website hosted on an appropriate server. The consumer of energy (or other entity that wishes to verify energy readings) retrieves a public key from the device (block 420). This public key may be on a label 282 or may be provided by any other appropriate mechanism as described above. The user may then use the public key to authenticate the information on the website (block 430) and retrieve the authenticated energy readings (block 440).

In order to secure packets transmitted between them, the energy monitoring devices 120 may use a shared key. In this example, before sending a packet to the next energy monitoring device 120, the originating energy monitoring device 120 encrypts the packet (or portion thereof) with the shared key. The receiving energy monitoring device 120 then decrypts the packet (or portion thereof) and only forwards the packet on to the next energy monitoring device 120 if the decryption process results in valid information. In this way, energy monitoring devices 120 or rogue devices may not insert themselves into the mesh network unless they know the shared key (or defeat the encryption/decryption algorithm).

The energy monitoring devices 120 may incorporate a GPS receiver or other mechanism for determining position (such as RF triangulation techniques). The position of each energy monitoring device 120 may be incorporated and secured in packets transmitted from the energy monitoring device using techniques such as those previously described. Any receiving device may then ignore data from a device that is not in an expected geographical location. This information may also be used to detect tampering such as for instance an energy monitoring device 120 being moved from its expected location. In addition, the portable communication device 180 may also incorporate a GPS receiver. The portable communication device may then compare its position to that of the energy monitoring device it is querying in order to verify it is querying the correct meter. This comparison may also be performed later after the data from the portable communication device 180 has been transferred to a computer.

At least one of the energy monitoring devices 120 may use pattern recognition or other techniques to scan packets they are forwarding to additional energy monitoring devices 120. These techniques may be used to detect rogue packets or packets containing malicious code. This may help prevent tampering with the system and may help prevent viruses from propagating through the system.

A mesh network provides redundancy in communications between devices. For enhanced reliability of the network it is desirable to have more than once communications path from each device. The computer 160 of the present invention may receive diagnostic information from the devices in the mesh network such that identification of devices with only one communications path leading from them may be identified to the user. Additional repeaters 155, gateways 150 or energy monitoring devices 120 may then be added to the system to improve reliability.

Figure 12:
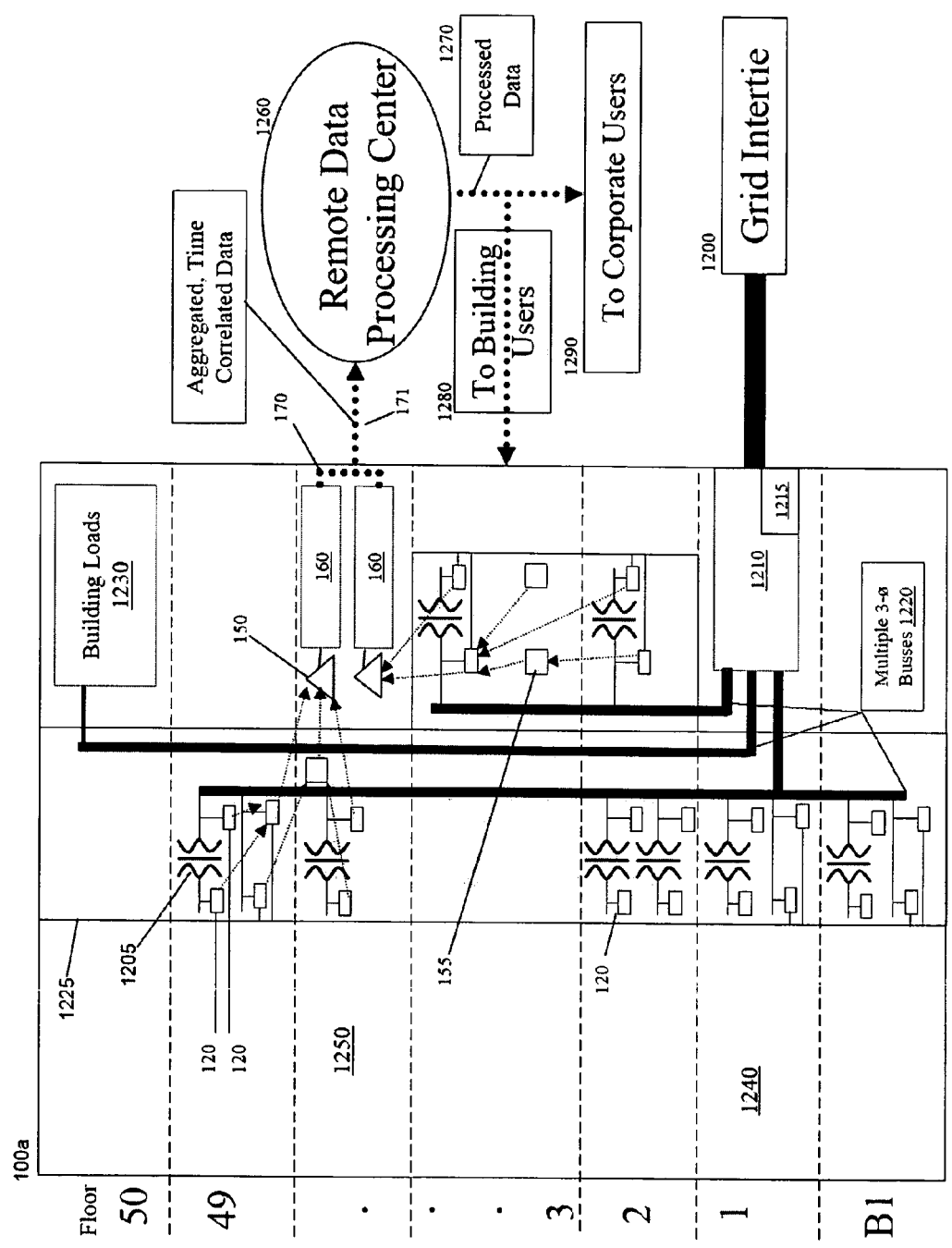
FIG. 12 depicts a block diagram of an alternate commercial building incorporating the system of the present invention.

FIG. 12 shows an alternative exemplary commercial office building 100a for use with the disclosed embodiments. The office building 100a receives main power from a grid intertie 1200 which interconnects the building's 100a internal power distribution network with the utility's power distribution grid. A service entrance infrastructure 1210 couples to the grid intertie and provides multiple 3 phase buses 1220 for powering various loads in the office building 100a. In typical installation, only one energy meter is provided in the building to measure power parameters of power flow from the grid intertie 1200 to the service entrance infrastructure 1210.

Subsequent to the service entrance metering, power is distributed inside the building through various vertical shafts either with traditional conductors (older buildings) or via bus ducts (newer installations). The shafts are much like elevator shafts, vertically on top of each other spanning multiple floors, except that the shaft is only physically big enough to allow the conductors to pass through the floors (whereas an elevator shaft is completely open).

On each floor the power is distributed further to provide energy for lighting, plugs and other tenant loads.

Most of the shared building loads 1230 of the commercial office building 100a are located on the roof. These loads include air conditioners, elevator motors, etc. The lease management office 1250 and engineering office floor 1240 are typically the only areas where the building owner or operator has office space. Therefore, gateways 150, computers 160, LAN 170 and WAN 171 connections for energy monitoring use are typically also located on these floors.

Energy consumption information may flow from the mesh networked devices (energy monitoring devices 120, repeaters 155 and gateways 150) through the computers 160, LAN 170, WAN 171 to a remote data processing center 1260 where usage information such as bills may be generated. This usage information 1270 is then returned to the building users 1280 through appropriate communication means. This information may also be delivered to corporate users 1290 such as the building owners/operators. A mesh network or other communications connection may be made to the service entrance meter 1215 in order that the computer 160 and/or remote data processing center 1260 may correlate the readings therefrom with those from the various energy monitoring devices 120. For instance if all loads within the office building 100a are monitored with energy monitoring devices 120, the combination of the energy monitoring devices readings should correlate with those of the service entrance meter 1215.

The building users may be presented with billing information that categorizes their actual energy usage and share of common loads by the remote data processing center 1260 by using the information from the energy monitoring devices 120.

Three phase transformers 1205 may be provided at various points in the office building 100a. In these cases it may be desirable to have energy monitoring devices 120 on both the inputs and outputs of the transformers to account for loses therein.

In one embodiment, the office building 100a, may contain one or more than one electrical closet shafts 1225. These shafts may split or be widely separated from one another. It may therefore be necessary to have multiple mesh networks within the building that comprises separate sets of energy monitoring devices 120, repeaters 155, gateways 150 and computers 160. Wireline segments or other means of bridging gaps in the mesh network may alternatively or in addition be used as described above.

When commissioning the system, battery powered mesh networking devices such as battery powered repeaters 155 may be temporarily installed in the building in order to "prove" out the network and identify areas where particular attention will have to be paid to establishing network links.

In addition, in some implementations, the low power RF signals of the mesh network may have difficulty traveling in a horizontal direction from the associated antennas of the devices 120 due to inherent limitations in the transmissive properties of such signals. Such limitations may result in a restricted transmission range. However, typically the vertical transmissive properties of the RF signals are acceptable. In one embodiment, the mesh network is formed via the vertical electrical shafts which allow for the vertically radiated RF signals to travel relatively unimpeded. The mesh network is carried to the roof of the facility or to another area having no substantial RF impediments, where the mesh network is bridged, either via a wired or wireless connection to other electrical shafts which have similarly formed mesh networks. In this way, the vertical transmissive properties of the RF signals are advantageously utilized and reliance on the horizontal transmissive properties are minimized. Alternatively, for buildings such as malls with a small number of floors, but a wide horizontal expanse, mounting devices 120 and/or repeaters 155 to form the mesh network along the roof also provides for an efficient network structure. Devices 120 monitoring rooftop loads such as air conditioners may perform "double duty" by extending the mesh network as well as monitoring a load. Repeaters 155 may be solar powered when mounted in rooftop locations or otherwise as described herein.

The following describes one exemplary implementation of a system incorporating aspects of the present invention. One exemplary implementation, which employs one or more of the disclosed embodiments, utilizes the ION 6100 Wireless Metering System, manufactured by Power Measurement, Ltd., located in Saanichton, British Columbia, Canada, which offers outstanding quality, versatility, and functionality in a low-cost wireless power and energy metering system ideal for sub-billing applications. This system is based on the PML ION 6100 Wireless Power Meter/monitoring device 120 and meets ANSI C12.16 Class 1 energy accuracy. This system may be utilized by Commercial (Office & Retail) Properties market in North America, and is ideal for customers who need revenue-accurate measurements for tenant sub-billing.

The system includes wireless metering devices, non-intrusive current transformers (CTs), and a central gateway that gathers, aggregates and logs meter data and exports it in an industry-standard XML format for integration into any software or billing system (including Power Measurement's ION EEM software).

The meters collect time-stamped, interval-based consumption data (kWh) from key sub-metering or sub-billing points throughout a building, then communicate the information to the central gateway (PC) via a proprietary wireless 900 MHz radio network. All meters are time-aligned with the gateway clock, so the system can also provide coincident demand readings.

The system offers customers a lower total cost of ownership (TCO) because: wireless communications eliminate the need to run costly communication wire and conduit throughout a facility; easy-to-use, split-core, current transformers (CTs) simply clamp onto existing wires for non-intrusive current measurements, simplifying installation; the ultra-compact meter design can attach to virtually any enclosure more than four inches deep with a single bolt; and automated gathering of meter data removes the need for manual meter reading.

The exemplary ION 6100 Wireless Metering System offers: high quality and accuracy, low installation costs (contributing to a lower Total Cost of Ownership); a complete system (meters, communications, gateway) (contributing to a lower Total Cost of Ownership); industry-standard XML data export for easy integration into any software system (such as the ION enterprise energy management system ("EEM"), manufactured by Power Measurement Ltd. located in Saanichton, British Columbia, Canada); and time synchronized for coincident demand calculations.

Unlike other power meters, which are sold separately and to a wide range of markets, this device is made available as part of a larger sub-billing solution for the commercial property market in North America.

The exemplary ION 6100 power meter offers:

Sub-Billing and Cost Allocation
Costs (including usage and demand charges) can be fairly accounted for and apportioned among tenants appropriately, increasing tenant satisfaction and lowering operating costs.

Low Total Cost of Ownership (TCO)
The system offers customers a lower total cost of ownership (TCO) because:
All necessary components can be purchased at once, on a single P.O.;
Wireless communications eliminate the need to run costly communication wire and conduit throughout a facility;
Easy-to-use, split-core, current transformers (CTs) simply clamp onto existing wires for non-intrusive current measurements, simplifying installation;
Simple installation ensures no disruptions to regular business processes;
Ultra-compact meter design can attach to virtually any enclosure more than two inches deep through a standard knockout with a ½" threaded conduit lock ring;
Automated gathering of meter data removes the need for manual meter reading.

Reliability
The ION 6100 offers a reliable "self-healing" approximately 900 MHz wireless radio network.

Each meter can relay a signal to the next closest meter, allowing signals to be easily transmitted from one end of a building to another. If a meter becomes unavailable, the other meters can communicate "around" it, so that there is no significant disruption in data transmission.

Useful Data
Besides sub-billing and cost allocation, data can be also used as an input to building automation and control systems, leveraging and maximizing the value of existing systems. The gateway can be used to capture a quick snapshot of overall operating performance and/or identify power problems at a particular load.

The ION 6100 Wireless Metering System is currently aimed at the North American commercial office and retail properties market, for buildings with greater than 500,000 square feet of leasable space and at least 20 tenants.

The key application for this system is sub-billing, but many commercial enterprises are also beginning to leverage these systems as core elements of a more comprehensive EEM solution focused on reducing energy costs and improving their net operating income (NOI) and overall asset value.

Value Proposition
For commercial building managers and owners in North America who need an accurate and automated system for fairly recovering energy costs from tenants. This system combines an accurate and reliable meter with a robust wireless communication network to create an automated sub-billing system with a low installation cost and a low total cost of ownership (TCO). Unlike traditional sub-metering devices, which must be manually read or that may lack the software required for efficient sub-billing or more powerful enterprise energy management. The ION 6100 Wireless Metering System is an integrated end-to-end solution for tenant sub-metering and a key piece of a comprehensive Enterprise Energy Management (EEM) system Exemplary relevant applications of the exemplary system include Primary Application: Sub-Billing

| Typical scenario before installing ION 6100 Wireless Metering System solution: | | |
|---|---|---|
| Existing Situation | No Metering | Existing Metering - No System |
| Desired Outcome | The property owner needs to recover the costs of supplying electricity to the individual tenants for the lowest cost possible. | The property owner needs to recover the costs of supplying electricity to the individual tenants for the lowest cost possible. |
| Attempted Approach | Energy and demand costs are either not passed through to the tenants, or costs are allocated to the tenants based on a common formula - normally based on the square footage of the tenant relative to the total leasable space of the building. | Meters are manually read either by a sub-billing service provider or by a designated individual or individuals employed by the property management company. |
| Interfering Factors | Some States prohibit allocation methods of cost recovery (Note: some prohibit sub-billing as well). Traditionally, the costs to implement a sub-metering system are high. | Even with existing metering that has communications ability the cost of implementing communications can be high. |
| Economic Consequences | Tenants are getting smarter and asking to be billed only for their own usage. Allocation methods are inaccurate and generally considered unfair. Accurate and reliable sub-billing is somewhere between being a competitive and a de-facto standard. | The labor and data integrity costs of managing these manual systems are high. The lack of resolution in the data (i.e. one monthly kWh reading) provides no insight into the opportunities that may be available to better manage costs. Allocation of coincident demand costs is not possible. |

Typical scenario after installing the exemplary ION 6100 Wireless Metering System solution:

| | | |
|---|---|---|
| New Approach Enabling Factors | A low TCO, highly accurate and reliably automated sub-billing system Low cost metering devices that are inexpensive to install (non-intrusive CTs, wireless communications) and maintain. Powerful and user-friendly data collection and billing software for providing detailed cost data. | A low TCO, highly accurate and reliably automated sub-billing system Low cost metering devices that are inexpensive to install (non-intrusive CTs, wireless communications) and maintain. Powerful and user-friendly data collection and billing software for providing detailed cost data. |
| Economic Rewards | Enables energy cost recovery in States that do not allow allocation methods. Competitive or sustained advantage relative to tenant satisfaction. Detailed interval data enables accurate coincident demand cost recovery. Detailed interval data enables insight to identify energy savings opportunities. | Competitive or sustained advantage relative to tenant satisfaction. Reduces costs due to manual reading and potential data entry errors. Detailed interval data enables accurate coincident demand cost recovery. Detailed interval data enables insight to identify energy savings opportunities. |

Secondary Applications include: Contract and Bill Validation, which can help customers verify that energy management improvements are generating the projected payback, high-accuracy measurements can also be used for utility bill verification; and Cost Allocation which can help monitor cost centers right down to the tool level, identify opportunities for demand control, and check energy consumption patterns.

The following tables describe features and benefits of the exemplary ION 6100 monitoring device as both a metering device and as a gateway device.

ION 6100 Metering Device

| Feature | Advantage | Benefit |
|---|---|---|
| ION 6100 meter, NICTs, wireless communications gateway | All the metering pieces in one neat little package | Simple to purchase, inexpensive to install and operate - Installed costs of $300 to $500 per metering point as compared with traditional sub-metering solutions |
| Non-intrusive current & voltage transformers (NICVTs/NICTs) and/or voltage displacement connections | The ION 6100 meters can be installed without requiring an outage in power to the load | Low installation cost, no installation disruption |
| Wireless radio network communications | No holes to drill, no conduit or wires to run, instant and automatic network configuration | Low installation costs, no communication configuration on the device - Reliable "self-healing" network communications |
| Exceeds ANSI C12.16 (1%) accuracy standards or appropriate local standard. | Accuracy is verified to national sub-metering standards | Costs can be fairly accounted for and apportioned appropriately |
| 24 hour internal data storage | Data is stored on the device as a backup in case of a temporary communication interruption | Low risk of data loss |
| Devices are time synchronized to the ION 6100 Gateway for coincident demand calculation | Independent device clocks are coordinated to enable accurate coincident demand calculations | Building demand charges can be accurately apportioned among tenants |

ION 6100 Gateway

| Feature | Advantage | Benefit |
|---|---|---|
| All data is collected in a central data file and exported as required | Gateway software can be configured to export data to multiple systems | Data can be used for sub-billing, as an input to building automation and control systems, etc. |
| Diagnostic data can be requested from devices | Other power, energy, communication and other diagnostic data can be viewed on the gateway from any device in the network | The gateway can be used to capture a quick snapshot of overall operating performance and/or identify power problems at a particular load. |

It is therefore intended that the foregoing detailed description be regarded as illustrative rather than limiting, and that it be understood that it is the following claims, including all equivalents, that are intended to define the spirit and scope of this invention.

We claim:

1. An energy monitoring device for securely reporting energy consumption, comprising:
   current interface circuitry operative to sense current flow in at least one power line and generate a first analog signal indicative thereof;
   at least one analog to digital converter coupled with said current interface circuitry and operative to convert said first analog signal to a digital representation of said sensed current flow;
   a processor coupled with said at least one analog to digital converter, and operative to calculate at least one measure of energy consumption based on said digital representation and store said calculated at least one measure of energy consumption as at least one energy consumption message;
   a memory register coupled with said processor and operative to store a private key, wherein said processor is further operative to generate a digital signature based on said at least one energy consumption message and said private key and sign said at least one energy consumption message utilizing said digital signature; and
   a radio frequency interface coupled with said processor and operative to transmit said signed at least one energy consumption message, via at least a second and a third energy monitoring device, to a remote device.

2. The energy monitoring device of claim 1, further comprising:
   voltage interface circuitry operative to sense voltage in said at least one power line and generate a second analog signal indicative thereof; and
   wherein said at least one analog to digital converter is further coupled with said voltage interface circuitry and operative to convert said second analog signal to a digital representation of said sensed voltage.

3. The energy monitoring device of claim 1 wherein said at least one measure of energy consumption comprises at least one of kWh, kVARh, kVAh, kW demand, kVAR demand and kVA demand.

4. The energy monitoring device of claim 1, wherein said at least said second and said third energy monitoring devices comprise a mesh communications network operative to interconnect said energy monitoring device with said remote device.

5. The energy monitoring device of claim 1, wherein said remote device comprises a data aggregation device.

6. The energy monitoring device of claim 1, wherein said signed at least one energy consumption message is capable of being authenticated by said remote device.

7. The energy monitoring device of claim 1, wherein said remote device comprises a mesh network node, said signed at least one energy consumption message being capable of being authenticated by said mesh network node prior to being retransmitted.

8. An energy monitoring device for securely reporting energy consumption, comprising:
   current interface circuitry operative to sense current flow in at least one power line and generate a first analog signal indicative thereof;
   voltage interface circuitry operative to sense voltage in said at least one power line and generate a second analog signal indicative thereof;
   at least one analog to digital converter coupled with said current and voltage interface circuitry and operative to convert said first and second analog signals to a digital representation of said sensed voltage and current flow;
   a processor coupled with said at least one analog to digital converter and operative to calculate at least one measure of energy consumption based on at least said digital representation;
   a cover enclosing said current interface circuitry, voltage interface circuitry, at least one analog to digital converter and processor;
   a memory register coupled with said processor and operative to store a private key;
   wherein said processor is further operative to generate a digital signature based on at least said private key and said at least one measure of energy consumption;
   a public key accessible from the outside of said cover, said public key associated with said private key; and
   a communications interface coupled with said processor and operative to transmit data comprising said measure of energy consumption and said digital signature to a remote device.

9. The energy monitoring device of claim 8 wherein said public key is visually accessible from the outside of said cover.

10. The energy monitoring device of claim 8 wherein said public key comprises at least one of said at least one measure of energy consumption.

11. The energy monitoring device of claim 8 wherein said public key comprises a code affixed to said cover.

12. The energy monitoring device of claim 11 wherein said public key comprises a serial number of the energy monitoring device.

13. The energy monitoring device of claim 11 wherein said public key is a broadcast by the energy monitoring device.

14. The energy monitoring device of claim 11, wherein said public key is machine readable.

15. The energy monitoring device of claim 11, wherein said public key is human readable.

16. The energy monitoring device of claim 8 further comprising a display, wherein said public key comprises a code displayed on said display.

17. The energy monitoring device of claim 8 wherein said communications interface comprises a radio frequency interface.

18. The energy monitoring device of claim 17 wherein said communications interface is operative to communicate with said remote device via at least one second energy monitoring device.

19. The energy monitoring device of claim 18 wherein each of said at least one second energy monitoring device is operative to encrypt and decrypt at least a portion of said data incorporating said measure of energy consumption.

20. The energy monitoring device of claim 17 wherein said remote device comprises a handheld meter reading device.

21. The energy monitoring device of claim 8 wherein said remote device comprises a handheld meter reading device.

22. The energy monitoring device of claim 8 wherein said remote device comprises a data aggregation device.

23. An energy monitoring device for securely reporting energy consumption, comprising:
current interface circuitry operative to sense current flow in at least one power line and generate a first analog signal indicative thereof;
voltage interface circuitry operative to sense voltage in said at least one power line and generate a second analog signal indicative thereof;
at least one analog to digital converter coupled to said current and voltage interface circuitry and operative to convert said first and second analog signals to a digital representation of said sensed voltage and current flow;
a processor coupled to said at least one analog to digital converter and operative to calculate at least one measure of energy consumption;
a cover enclosing said current interface circuitry, voltage interface circuitry, at least one analog to digital converter and processor;
a memory register coupled to said processor and operative to store a private key;
a second memory register coupled to said processor and operative to store said at least one measure of energy consumption;
a third memory register coupled to said processor; said processor operative to store a hash of said private key and said at least one measure of energy consumption in said third memory register; and a communications interface coupled with said processor and operative to transmit
data comprising at least the contents of said second memory register and said third memory register.

24. The energy monitoring device of claim 23 wherein said data is operative to be received and recorded in a handheld meter reading device.

25. The energy monitoring device of claim 23 wherein said data is operative to fit within a standard energy register.

26. The energy monitoring device of claim 23 wherein said data further comprises a public key associated with said private key.

27. The energy monitoring device of claim 23 wherein said at least one measure of energy consumption comprises at least one of kWh, kVARh, kVAh, kW demand, kVAR demand and kVA demand.

28. The energy monitoring device of claim 23, wherein said contents of said third memory register is capable of authenticating said contents of said second memory register.

29. The energy monitoring device of claim 23, wherein said communications interface is further operative to transmit said data to a remote device via a mesh communications network, wherein said data is capable of being authenticated by said remote device based on said contents of said third memory register.

30. The energy monitoring device of claim 23, wherein said communications interface is further operative to transmit said data to a remote device via a mesh communications network comprising a plurality of nodes, wherein said data is capable of being authenticated by each of said plurality of nodes prior to being retransmitted to another of said plurality of nodes.

31. A method of securely reporting energy consumption, said method comprising: sensing current flow in at least one power line and generating a first analog signal indicative thereof;
converting said first analog signal to a digital representation of said sensed current flow;
calculating at least one measure of energy consumption based on said digital representation and storing said calculated at least one measure of energy consumption as at least one energy consumption message;
storing a private key;
generating a digital signature based on said at least one energy consumption message and said private key and signing said at least one energy consumption message utilizing said digital signature; and
transmitting via radio frequency said signed at least one energy consumption message, via at least a second and a third energy monitoring device, to a remote device.

32. The method of claim 31 wherein said at least one measure of energy consumption comprises at least one of kWh, kVARh, kVAh, kW demand, kVAR demand and kVA demand.

33. The method of claim 31, further comprising authenticating said signed at least one energy consumption message by said remote device.

34. The method of claim 31, wherein said remote device comprises a mesh network node, said method further comprising authenticating said signed at least one energy consumption message by said mesh network node and retransmitting said signed at least one energy consumption message if authentic.

35. A method of securely reporting energy consumption, comprising:

sensing, by current interface circuitry, current flow in at least one power line and generating a first analog signal indicative thereof;

sensing, by voltage interface circuitry, voltage in said at least one power line and generating a second analog signal indicative thereof;

converting, by at least one analog to digital converter, said first and second analog signals to a digital representation of said sensed voltage and current flow;

calculating, by a processor, at least one measure of energy consumption based on at least said digital representation;

enclosing said current interface circuitry, voltage interface circuitry, at least one analog to digital converter and processor within a cover;

storing a private key;

generating a digital signature based on at least said private key and said at least one measure of energy consumption;

providing a public key accessible from the outside of said cover, said public key associated with said private key; and transmitting data comprising said measure of energy consumption and said digital signature to a remote device.

36. The method of claim 35 wherein said providing further comprises visually providing said public key so as to be visually accessible from the outside of said cover.

37. The method of claim 35 wherein said public key comprises at least one of said at least one measure of energy consumption.

38. The method of claim 35 wherein said public key comprises a code affixed to said cover.

39. The method of claim 38 wherein said public key comprises a serial number of the energy monitoring device.

40. The method of claim 38 wherein said providing further comprises broadcasting said public key by the energy monitoring device.

41. The method of claim 38, wherein said public key is machine readable.

42. The method of claim 38, wherein said public key is human readable.

43. The method of claim 35 further comprising a display, wherein said public key comprises a code, said providing further comprising displaying said public key on said display.

44. The method of claim 35 wherein said transmitting further comprises transmitting via a radio frequency medium.

45. The method of claim 44 wherein said transmitting further comprises transmitting to said remote device via at least one second energy monitoring device.

46. The method of claim 45 wherein each of said at least one second energy monitoring device is operative to encrypt and decrypt at least a portion of said data incorporating said measure of energy consumption.

47. The method of claim 44 wherein said remote device comprises a handheld meter reading device.

48. The method of claim 35 wherein said remote device comprises a handheld meter reading device.

49. The method of claim 35 wherein said remote device comprises a data aggregation device.

50. An energy monitoring device for securely reporting energy consumption, comprising:

means for sensing current flow in at least one power line and generating a first analog signal indicative thereof;

means for converting said first analog signal to a digital representation of said sensed current flow;

means for calculating at least one measure of energy consumption based on said digital representation and storing said calculated at least one measure of energy consumption as at least one energy consumption message;

means for storing a private key;

means for generating a digital signature based on said at least one energy consumption message and said private key and signing said at least one energy consumption message utilizing said digital signature; and means for transmitting via radio frequency said signed at least one energy consumption message, via at least a second and a third energy monitoring device, to a remote device.

51. An energy monitoring device for securely reporting energy consumption, comprising:

means for sensing current flow in at least one power line and generating a first analog signal indicative thereof;

means for sensing voltage in said at least one power line and generating a second analog signal indicative thereof;

means for converting said first and second analog signals to a digital representation of said sensed voltage and current flow;

means for calculating at least one measure of energy consumption based on at least said digital representation;

means for enclosing said means for sensing current flow, means for sensing voltage, means for converting and means for calculating;

means for storing a private key;

means for generating a digital signature based on at least said private key and said at least one measure of energy consumption;

means for providing a public key accessible from the outside of said means for enclosing, said public key associated with said private key; and means for transmitting data comprising said measure of energy consumption and said digital signature to a remote device.

* * * * *

UNITED STATES PATENT AND TRADEMARK OFFICE
CERTIFICATE OF CORRECTION

| | | |
|---|---|---|
| PATENT NO. | : 7,089,089 B2 | |
| APPLICATION NO. | : 10/892837 | |
| DATED | : August 8, 2006 | |
| INVENTOR(S) | : Daniel A. Cumming et al. | |

It is certified that error appears in the above-identified patent and that said Letters Patent is hereby corrected as shown below:

On the Title Page

In column 2, line 2, under "U.S. PATENT DOCUMENTS", delete "4,641,284" and substitute --5,641,248-- in its place.

Page 2, column 1, line 36, under "U.S. PATENT DOCUMENTS", after "6,373,238" delete "B1" and substitute --B2-- in its place.

Page 2, column 1, line 38, under "U.S. PATENT DOCUMENTS", after "6,462,713" delete "B1" and substitute --B2-- in its place.

Page 2, column 1, line 45, under "U.S. PATENT DOCUMENTS", after "6,633,823" delete "B1" and substitute --B2-- in its place.

Page 2, column 1, line 46, under "U.S. PATENT DOCUMENTS", after "6,650,249" delete "B1" and substitute --B2-- in its place.

Page 2, column 1, line 47, under "U.S. PATENT DOCUMENTS", after "6,671,586" delete "B1" and substitute --B2-- in its place.

Page 2, column 1, line 53, after "2001/0039537 A1" delete "11/2001" and substitute --08/2001-- in its place.

Page 3, column 1, line 3, delete "journal.shtml ," and substitute --journal.shtml,-- in its place.

Page 3, column 1, line 9, before "Card for Revenue" delete "Protocl" and substitute --Protocol-- in its place.

Page 3, column 1, lines 48-49, delete "http://www.questra.com/h1_products/Questra.A2Bplatform" and substitute --http://www.questra.com/h1_products/Questra_A2Bplatform-- in its place.

Page 3, column 1, line 63, immediately after "server.pdf" insert --,-- (comma).

Page 3, column 2, line 29, after "2001" delete "on Jul. 19, 2001".

Page 3, column 2, line 34, immediately after "devicelink/" insert --,-- (comma).

Page 3, column 2, line 37, immediately after "com/" delete "." (period) and substitute --,-- (comma) in its place.

UNITED STATES PATENT AND TRADEMARK OFFICE
CERTIFICATE OF CORRECTION

PATENT NO. : 7,089,089 B2
APPLICATION NO. : 10/892837
DATED : August 8, 2006
INVENTOR(S) : Daniel A. Cumming et al.

It is certified that error appears in the above-identified patent and that said Letters Patent is hereby corrected as shown below:

On the Title Page (cont'd)

Page 3, column 2, line 38, after "First" delete "publishes" and substitute --published-- in its place.

Page 4, column 1, line 4, delete "Lusted THPM" and substitute --Lusted "THPM-- in its place.

Page 4, column 1, line 13, immediately before "AT&T" insert --"-- (opening quotation marks).

Page 4, column 1, line 14, immediately after "Solutions," insert --"-- (closing quotation marks).

Page 4, column 1, line 17, immediately before "TECO" insert --"-- (opening quotation marks).

Page 4, column 1, line 18, immediately after "Here" insert --"-- (closing quotation marks).

Page 4, column 2, line 32, immediately before "Wireless Data" insert -- "-- (opening quotation marks).

Page 4, column 2, line 33, immediately after "Blaster," insert --"-- (closing quotation marks).

Page 4, column 2, line 57, delete "Cincinnato" and substitute --Cincinnati-- in its place.

In the Claims

Columns 26, in claim 23, line 1, after "register; and" start a new paragraph with "a communications interface coupled".

Column 26, in claim 23, line 2, after "transmit" insert --data comprising at least the contents of said second--.

Column 26, in claim 23, line 4, delete "data comprising at least the contents of said second".

UNITED STATES PATENT AND TRADEMARK OFFICE
CERTIFICATE OF CORRECTION

PATENT NO. : 7,089,089 B2
APPLICATION NO. : 10/892837
DATED : August 8, 2006
INVENTOR(S) : Daniel A. Cumming et al.

It is certified that error appears in the above-identified patent and that said Letters Patent is hereby corrected as shown below:

In the Claims (cont'd)

Column 26, in claim 31, line 35, after "method comprising:" start a new paragraph with "sensing current flow in".

Signed and Sealed this

Tenth Day of April, 2007

JON W. DUDAS
*Director of the United States Patent and Trademark Office*